US012117750B2

(12) United States Patent
Hirano et al.

(10) Patent No.: US 12,117,750 B2
(45) Date of Patent: Oct. 15, 2024

(54) IMAGE FORMING APPARATUS

(71) Applicant: CANON KABUSHIKI KAISHA, Tokyo (JP)

(72) Inventors: Shigeru Hirano, Tokyo (JP); Takahiro Ohnishi, Chiba (JP); Kiyonori Sotome, Ibaraki (JP); Hiroto Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/357,061

(22) Filed: Jul. 21, 2023

(65) Prior Publication Data

US 2024/0077817 A1 Mar. 7, 2024

(30) Foreign Application Priority Data

Aug. 24, 2022 (JP) ................................ 2022-133399
Aug. 24, 2022 (JP) ................................ 2022-133400

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
USPC .................................................. 399/69, 122
See application file for complete search history.

(56) References Cited

U.S. PATENT DOCUMENTS

| | | | | |
|---|---|---|---|---|
| 9,274,487 | B2 | 3/2016 | Ohnishi ................. | G03G 15/00 |
| 9,291,958 | B2 | 3/2016 | Nakamoto et al. ..... | G03G 15/20 |
| 9,323,185 | B2 | 4/2016 | Ohnishi ................. | G03G 15/20 |
| 10,241,433 | B2 | 3/2019 | Tanaka et al. ......... | G03G 15/20 |
| 10,545,442 | B1 | 1/2020 | Hirano et al. ......... | G03G 15/20 |
| 10,642,201 | B2 | 5/2020 | Ohnishi ................. | G03G 15/20 |
| 11,163,250 | B2 | 11/2021 | Yasui et al. ............ | G03G 15/20 |
| 2022/0011698 | A1 | 1/2022 | Yasui et al. ............ | G03G 15/20 |

FOREIGN PATENT DOCUMENTS

| | | |
|---|---|---|
| JP | 2004347912 | * 12/2004 |
| JP | 2020-013013 | 1/2020 |

* cited by examiner

*Primary Examiner* — Hoan H Tran
(74) *Attorney, Agent, or Firm* — Venable LLP

(57) ABSTRACT

An image forming apparatus includes a fixing device which includes a fixing unit including an endless fixing belt, a heating portion, and a temperature detecting portion and which includes a nip forming member; a first storing portion; and a controller. In a case that a predetermined part of a plurality of parts is exchanged, the controller succeeds information other than information on the predetermined part of information on the fixing device stored in the first storing portion, and determines a target temperature in temperature adjustment control by using the succeeded information and information on the predetermined part used after being exchanged.

7 Claims, 19 Drawing Sheets

| | FILM KIND | TARGET TEMP. T[°C] | | SURFACE TEMP. Ts[°C] |
|---|---|---|---|---|
| | | | $\alpha_x$ | |
| REFERENCE | FILM A (PRESENT) | 206 | 1.000 | 195 |
| BEFORE CORRECTION | FILM B (CHANGED) | 206 | – | 199 |
| AFTER CORRECTION | FILM B (CHANGED) | 204 | 0.990 | 195 |

FIG. 9

| ENVIRONMENT | PAPER KIND | | REFERENCE TEMP. $T_x$ (°C) | FILM A | | FILM B | |
|---|---|---|---|---|---|---|---|
| | | | | $\alpha_x$ | TARGET TEMP. T (°C) | $\alpha_x$ | TARGET TEMP. T (°C) |
| HIGH-TEMP. | A | T.P. | 209 | 1.00 | 209 | 0.995 | 208 |
| | B | P.P. | 200 | | 200 | | 199 |
| | C | R.P. | 184 | | 184 | | 183 |
| NORMAL-TEMP. | A | T.P. | 215 | 1.00 | 215 | 0.990 | 213 |
| | B | P.P. | 206 | | 206 | | 204 |
| | C | R.P. | 190 | | 190 | | 188 |
| LOW-TEMP. | A | T.P. | 240 | 1.00 | 240 | 0.985 | 236 |
| | B | P.P. | 230 | | 230 | | 227 |
| | C | R.P. | 221 | | 221 | | 218 |

FIG. 10

| COMP. EX. OR EMB. | FILM KIND | TARGET TEMP. [°C] T | TARGET TEMP. INFO. α | FILM SURFACE TEMP. [°C] | DISCRIMINATION RESULT | | |
|---|---|---|---|---|---|---|---|
| | | | | | LOW-TEMP. QUAL. | HIGH-TEMP. QUAL. | FEEDING FAILURE |
| COMP.EX. 1 | FIXING FILM 20a | 206°C | — | 195°C | ○ | ○ | ○ |
| COMP.EX. 2 | FIXING FILM 20b | 206°C | — | 199°C | ○ | × | ○ |
| COMP.EX. 3 | FIXING FILM 20c | 206°C | — | 189°C | × | ○ | ○ |
| EMB. 1 | FIXING FILM 20a | 206°C | 1.000 | 195°C | ○ | ○ | ○ |
| EMB. 2 | FIXING FILM 20b | 204°C | 0.990 | 195°C | ○ | ○ | ○ |
| EMB. 3 | FIXING FILM 20c | 213°C | 1.034 | 195°C | ○ | ○ | ○ |

FIG. 18

| TEMPERATURE CONTROL INFORMATION $\alpha_x$ | | PRESSING MEMBER A | PRESSING MEMBER B |
|---|---|---|---|
| FIXING MEMBER | A | 1.000 | 0.997 |
| FIXING MEMBER | B | 0.990 | 0.987 |

FIG. 19

IMAGE FORMING APPARATUS

FIELD OF THE INVENTION AND RELATED ART

The present invention relates to an image forming apparatus such as a copying machine, a printer, a facsimile machine, a multi-function machine having a plurality of functions of these machines, and the like.

The image forming apparatus includes a fixing device for fixing a toner image by heating the toner image carried on a recording material. As such a fixing device, for example, a constitution in which a temperature of a heater for heating a fixing belt is detected by a thermistor and then the heater is subjected to temperature adjustment control so that a detection temperature of the thermistor becomes a target temperature has been conventionally known (Japanese Laid-Open Patent Application (JP-A) 2020-13013).

Further, JP-A 2020-13013 discloses a constitution in which inner/outer surface temperature difference information of the fixing belt is stored in advance in a storing portion provided in the fixing device and then a target temperature during the temperature adjustment control is corrected by reading this information during exchange of the fixing device.

However, in the case where the fixing device is mass-produced, dimensions and thermal characteristics of (component) parts constituting the fixing device have a normal variation within a standard range. For example, when the part is the fixing belt, the fixing belt has variations in thickness of layers such as a base layer, an elastic layer, and a surface layer, and when the part is a temperature detection thermistor, the temperature detection thermistor has proper variations in resistance value and shape of an element and dimension of a back-up member, and the like. Such variations are inevitable as mass-production parts, and when these parts are incorporated and operated in the fixing device, the above-described variations directly lead to a variation in surface temperature of the fixing belt, so that influence on performances, such as a fixing property, an image property, a feeding (conveying property), and the like, of the fixing device occurs.

Further, depending on a shipping form in a manufacturing step, there are cases of the fixing device, a fixing unit (heating unit portion of the fixing device), and a set of the fixing unit and a pressing roller (nip forming member), and the like case. In the case of shipping in the form of the fixing device, it becomes possible to correct the target temperature in temperature adjustment control by using information stored in a storing portion of the fixing device. However, in the case of shipping in the form of the fixing unit alone or the set of the fixing unit and the pressing roller, for example, a state of the pressing roller or a pressing force in a heat transfer characteristic information during shipping and a state of the pressing roller or a pressing force when the pressing roller is actually incorporated in the fixing device are different from each other, and therefore, a difference in heat transfer characteristic occurs in some instances between during the shipping and during incorporation of the pressing roller. In this case, these is a liability that influence on the performance of the fixing device occurs.

SUMMARY OF THE INVENTION

A principal object of the present invention is to provide an image forming apparatus capable of suppressing influence on a performance of a fixing device even in the case where a fixing unit is exchanged singly or in the case where a set of the fixing unit and a nip forming member is exchanged.

According to an aspect of the present invention, there is provided an image forming apparatus comprising: a fixing device configured to fix a toner image on a recording material, wherein the fixing device includes a fixing unit including an endless fixing belt, a heating portion for heating a fixing belt, and a temperature detecting portion for detecting a temperature of the fixing belt and includes a nip forming member for forming a nip in which a recording material carrying thereon a toner image is nipped and fed between itself and the fixing belt and in which the toner image is fixed on the recording material, and wherein each of a plurality of parts including the fixing unit and the nip forming member and used in the fixing device is capable of being exchanged; a first storing portion configured to store information on the fixing device; and a controller configured to carry out temperature, adjustment control of the heating portion on the basis of the temperature detected by the detecting portion, wherein in a case that a predetermined part of the plurality of parts is exchanged, the controller succeeds information other than information on the predetermined part of the information on the fixing device stored in the first storing portion, and determines a target temperature in the temperature adjustment control by using the succeeded information and information on the predetermined part used after being exchanged.

Further features of the present invention will become apparent from the following description of exemplary embodiments with reference to the attached drawings.

BRIEF DESCRIPTION OF THE DRAWINGS

FIG. 9 is a table showing a relationship between a target temperature and a fixing film in each of the comparison example and a second embodiment.

FIG. 10 is a table showing a relationship between target temperatures and correction coefficients before and after fixing film exchange in the second embodiment.

FIG. 18 is a table in which results of the specific comparison examples 1 to 3 and the specific embodiments 1 to 3 are summarized.

FIG. 19 is a table showing a relationship between correction coefficients in combinations of fixing films (fixing members) and pressing rollers (pressing members).

DESCRIPTION OF THE EMBODIMENTS

First Embodiment

A first embodiment will be described using FIGS. 1 to 7. First, a general structure of an image forming apparatus according to this embodiment will be described.

[Image Forming Apparatus]

Figure 1:
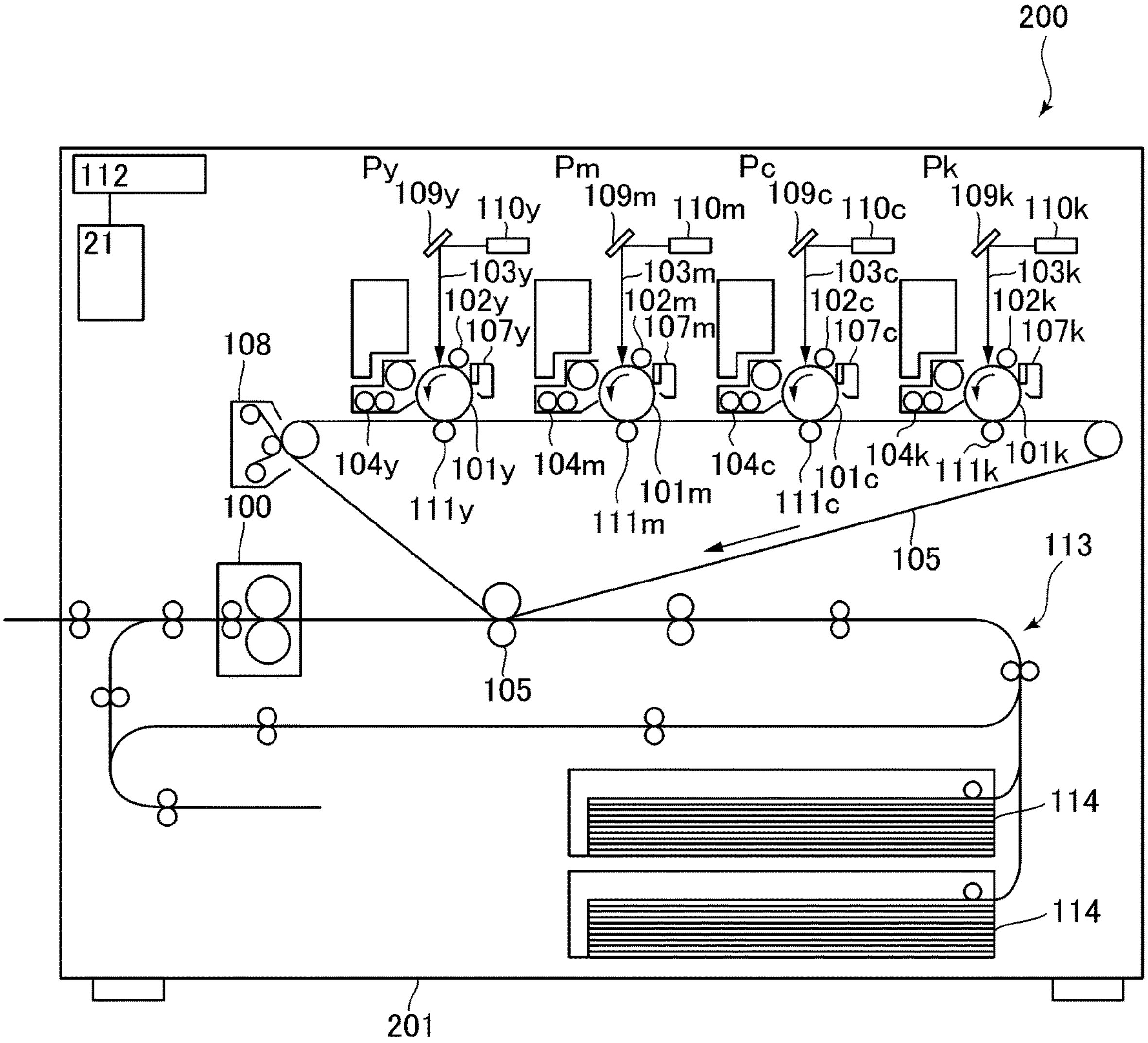
FIG. 1 is a schematic sectional view of an image forming apparatus according to a first embodiment.

FIG. 1 is a schematic sectional view of an image forming apparatus 200 of this embodiment, and the image forming apparatus 200 forms an image by utilizing an electrophotographic process. Further, the image forming apparatus 200 forms a full-color toner image with use of toners of four colors consisting of yellow (y), magenta (m), cyan (c), and black (k). For this reason, the image forming apparatus 200 includes a plurality of image forming portions Py, Pm, Pc, and Pk for forming toner images of the respective toner images. The image forming portions Py, Pm, Pc, and Pk include suffixes y, m, c, and k corresponding to associated colors of the toner images, respectively.

Photosensitive drums 101*y* to 101*k* as image bearing members are cylindrical photosensitive members, and are rotationally driven in the clockwise direction indicated by arrows at a predetermined process speed (peripheral speed). The photosensitive drums 101*y* to 101*k* are electrically charged to a predetermined polarity by charging devices 102*y* to 102*k* such as charging rollers during rotation process thereof.

Then, the charged surfaces of the photosensitive drums 101*y* to 101*k* are exposed to laser light beams 103*y* to 103*k*, outputted from laser optical systems (exposure devices) 110*y* to 110*k*, respectively, on the basis of inputted image information. The laser optical systems 110*y* to 110*k* subject the surfaces of the photosensitive drums 101*y* to 101*k* to scanning exposure to light by outputting the laser light beams 103*y* to 103*k* each modulated (ON/OFF) correspondingly to a time-series electric digital pixel signal of objective image information from an image signal generation device such as an unshown image reading device. As a result, by this scanning exposure to light, on the surfaces of the photosensitive drums 101*y* to 101*k*, electrostatic latent images each corresponding to the associated image information are formed, respectively. The laser light beams 103*y* to 103*k* outputted from the laser optical systems 110*y* to 110*k* are deflected to exposure positions of the photosensitive drums 101*y* to 101*k* by mirrors 109*y* to 109*k*, respectively.

The electrostatic latent image formed on the photosensitive drum 101*y* in the image forming portion Py is visualized with yellow toner by a developing device 104*y*. A resultant yellow toner image is transferred onto a surface of an intermediary transfer member 105 in a primary transfer portion 111*y* which is a contact portion between the photosensitive drum 101*y* and the intermediary transfer member (an intermediary transfer belt in this embodiment) 105. Incidentally, toner remaining on the surface of the photosensitive drum 101*y* is removed by a cleaner 107*y*.

A cycle of the above-described process of charging, exposure, development, primary transfer and drum cleaning is similarly repeated for forming a magenta toner image, a cyan toner image, and a black toner image in other image forming portions Pm, Pc, and Pk, so that the respective color toner images are successively transferred onto the intermediary transfer member 105 superposedly.

The resultant toner images of multi-colors formed on the intermediary transfer member 105 is collectively secondary-transferred onto a sheet (recording material) P in a secondary transfer portion 106. The sheet P is a sheet such as paper or a plastic film, and is fed from a cassette 114 to the secondary transfer portion 106 through a sheet feeding (conveying) portion 113. Toner remaining on the intermediary transfer member 105 is removed by a cleaner 108.

The sheet P passed through the secondary transfer portion 106 is guided to a fixing device 100 as an image heating device, and an unfixed toner image carried thereon is subjected to a fixing process (image heating process). Then, the sheet P subjected to the fixing process is discharged to an outside of the image forming apparatus, so that a series of image forming operation process is ended.

Figure 2:
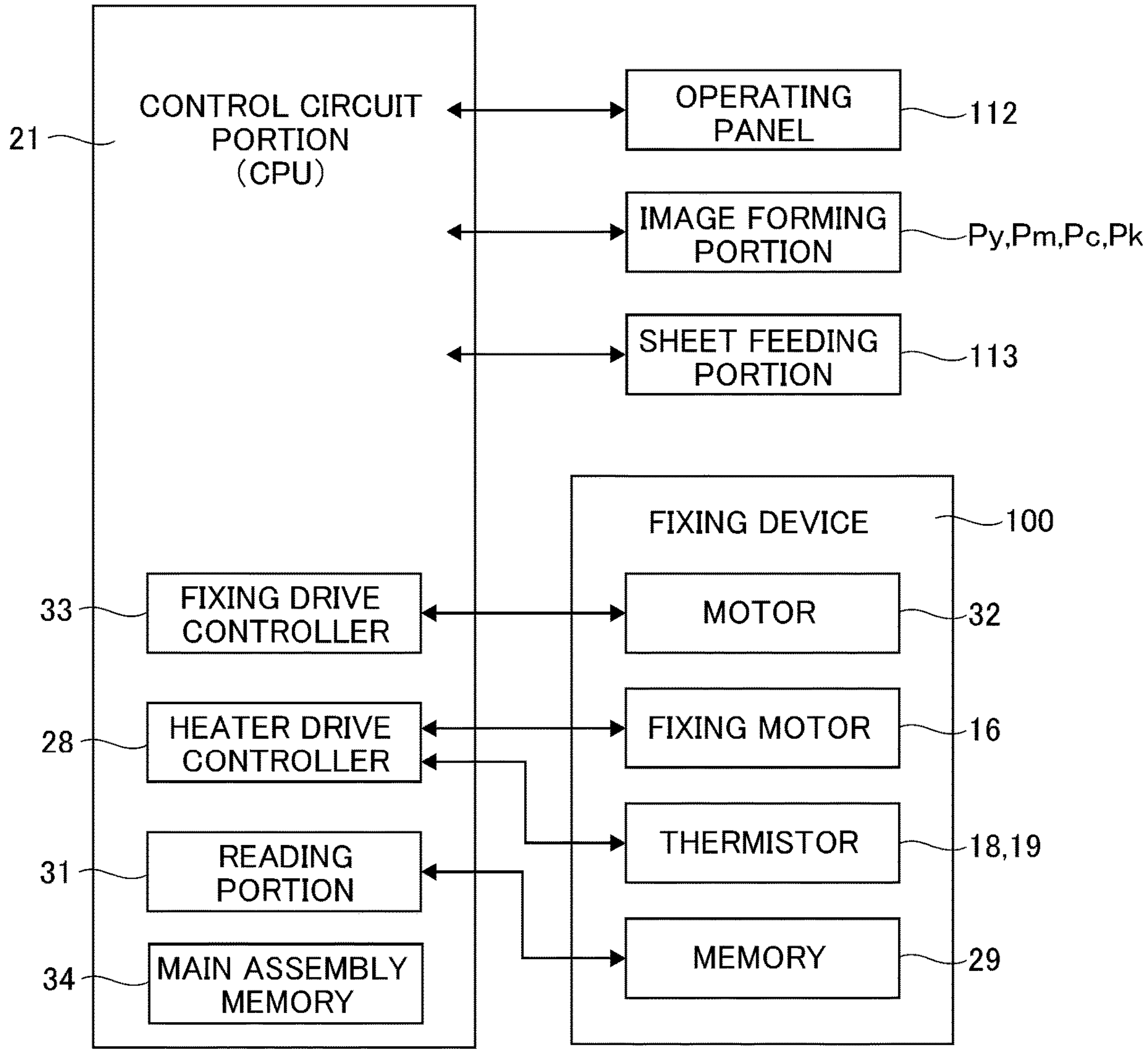
FIG. 2 is a control block diagram of the image forming apparatus according to the first embodiment.

The image forming apparatus 200 includes, as shown in FIG. 2, a control circuit portion (controller) 21 represented by a CPU or the like and an operating panel portion 112 which is an interface for permitting communication with a user or an external device and access to the devices. The control circuit portion 21 controls an operation of entirety of the image forming apparatus by centralizing a line of instructions between the respective devices while monitoring and controlling states of respective portions in the image forming apparatus including the sheet feeding portion 113 and the fixing device 100. Further, the image forming apparatus 200 includes a main assembly memory 34 as a first storing portion in which various pieces of information such as information on the fixing device 100 are stored. The information on the fixing device 100 will be described later.

[Fixing Device]

Figure 3:
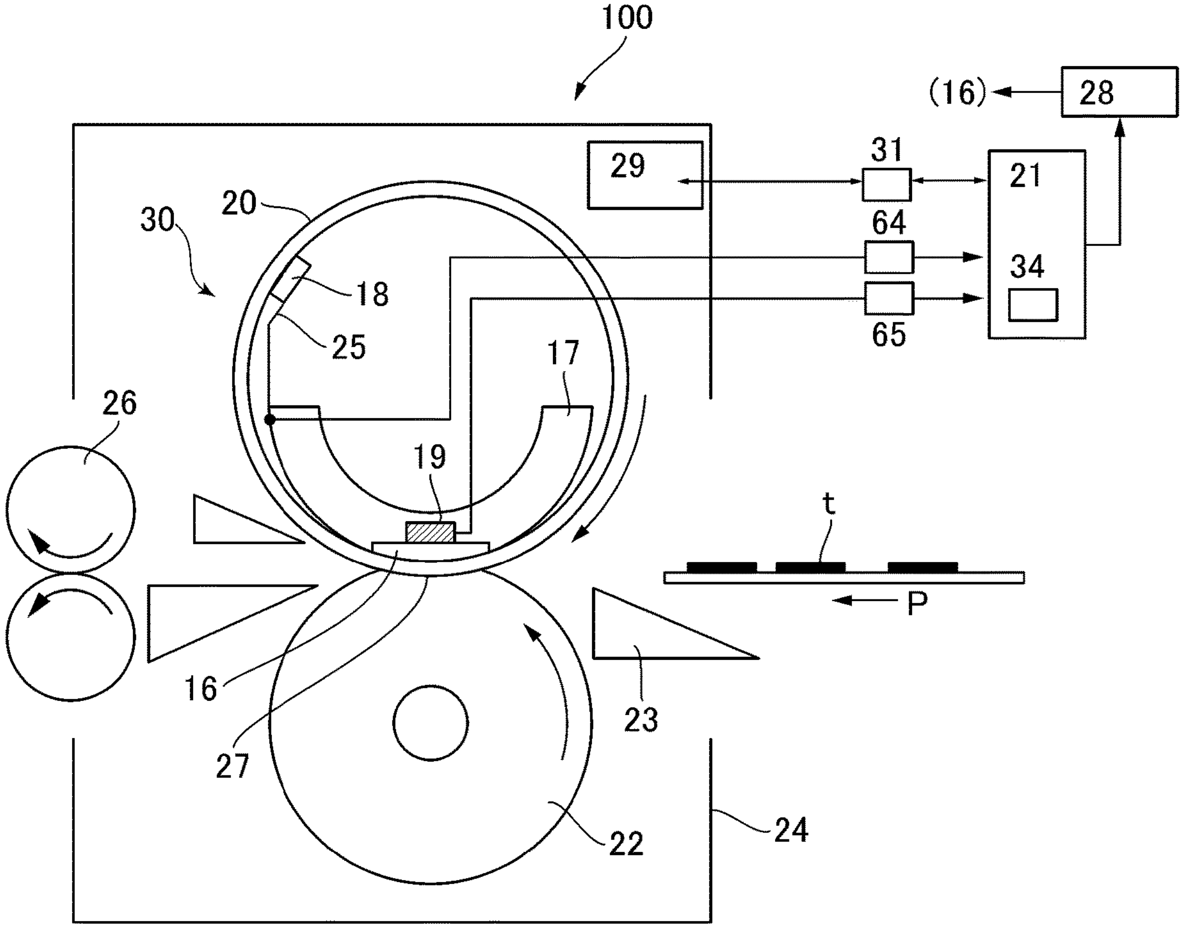
FIG. 3 is a schematic sectional view of a fixing device in the first embodiment.

Next, the fixing device 100 will be described using FIG. 3 with reference to FIG. 2. The fixing device 100 in this embodiment is detachably mountable to an image forming apparatus main assembly 201 of the image forming apparatus 200. That is, the image forming apparatus 200 has a constitution in which the fixing device 100 is capable of being exchanged.

Further, in this embodiment, the fixing device 100 has a constitution in which either one of a fixing unit 30 alone and a set of the fixing unit 30 and a pressing roller 22 is capable of being exchanged as described later. For example, the fixing unit 30 of the fixing device 100 is exchanged and the fixing device 100 in which the fixing unit 30 is exchanged is capable of being mounted in the image forming apparatus main assembly 201. Or, the fixing unit 30 and the pressing roller 22 are exchanged and the fixing device 100 in which these members are exchanged is capable of being mounted in the image forming apparatus main assembly 201.

The fixing device 100 includes a fixing film 20 as an endless fixing belt, the pressing roller 22 as a nip forming member, a fixing heater 16 as a heating portion, a heater back thermistor 19 as a first temperature detecting portion, a film back thermistor 18 as a temperature detecting portion and a second temperature detecting portion, and the like. The fixing film 20 is a cylindrical endless belt including an elastic layer.

The pressing roller 22 is a pressing member for forming a fixing nip 27 between itself and the fixing film 20. The fixing nip 27 is a nip for fixing the toner image on the recording material by nipping and feeding the sheet (recording material) P on which the toner image is carried. The fixing heater 16 is a heater for heating the fixing film 20, and is a plate-like heater disposed on an inside (back side) of the fixing film 20 in the fixing nip 27 in this embodiment. The fixing heater 16 is held by a heater holder 17 of which cross-sectional shape is a substantially trough-like member and which has a heat-resistant property. Specifically, the fixing heater 16 is bonded and fixed to a lower surface of the heater holder 17 along a longitudinal direction (rotational axis direction of the pressing roller 22). Further, the fixing film 20 is externally fitted to a periphery of the heat holder 17. In the following, respective constitutions will be specifically described.

The fixing film 20 has a structure such that an about 300 μm-thick silicone rubber layer (elastic layer) is formed on a cylindrical base material formed with an about 30 μm-thick cylindrical stainless steel and the elastic layer is coated with an about 30 μm-thick PFA resin tube (outermost layer) as a surface layer. The pressing roller 22 has a structure such that on a core metal of Fe, an about 2.5 mm-thick silicone rubber layer and an about 50 μm-thick PFA resin tube are laminated. Opposite end portions of the core metal of this pressing roller 22 are rotatably held between opposite side plates of the fixing device 100.

On an upper side of the pressing roller 22, the fixing unit 30 including the fixing heater 16, the heat holder 17, and the fixing film 20 is provided. The fixing unit 30 includes the film back thermistor 18 and the heater back thermistor 19 in addition to these members. This fixing unit 30 is provided in parallel to the pressing roller 22 so as to contact the pressing roller 22 on a fixing heater 16 side thereof.

The heat holder 17 is formed with a liquid crystal polymer having a high heat-resistant property and has a function of holding the fixing heater 16 and guiding circulating track of the fixing film 20. Opposite end portions of the heater holder are urged toward an axis of the pressing roller 22 with a force of 157N on one side, i.e., 314N in total by pressing springs 36 (see FIG. 4) as pressing portions provided on a frame 24 of the fixing device 100. That is, the pressing springs 36 press the fixing film 20 toward the pressing roller 22 through the heater holder 17. As a result, the surface of the fixing heater 16 is press-contacted against the elastic layer of the pressing roller 22 through the fixing film 20 with a predetermined pressing force, so that the fixing nip 27 with a predetermined width necessary for fixing is formed.

The fixing heater 16 includes a heat generating resistor prepared by applying electroconductive paste containing silver/palladium alloy onto a ceramic substrate of alumina or aluminum nitride in an about 10 μm-thick uniform film shape by a screen printing method. Further, on the heat generating member, a glass coat is formed in order to ensure resistance to pressure.

The heater back thermistor 19 is provided on a surface (back surface) on a side opposite from a sliding surface of the fixing heater 16 and has a function of detecting a back surface temperature of the fixing heater 16. That is, the heater back thermistor 19 detects the temperature of the surface of the fixing heater 17 on a side opposite from the fixing film 20. The film back thermistor 18 detects a temperature of the fixing film 20. That is, the film back thermistor 18 is provided so as to elastically contact an inner peripheral surface of the fixing film 20 at a position above the heater holder 17 and has a function of detecting an inner surface temperature of the fixing film 20. Specifically, a temperature detecting thermistor is mounted at an end of an arm 25 of stainless steel fixedly supported by the heater holder 17 and the arm 25 is elastically swung, so that even in a state in which motion of the inner surface of the fixing film 20 becomes unstable, a state in which the thermistor always contacts the inner surface of the fixing film 20 is maintained.

The heater back thermistor 19 and the film back thermistor 19 are connected to the control circuit portion 21 via A/D converters 64 and 65, respectively. This control circuit portion 21 samples an output from each of the thermistors at a predetermined cyclic period and has a constitution in which the thus-acquired temperature information is reflected in temperature control. That is, the control circuit portion 21 determines contents of temperature adjustment control of the fixing heater 16 on the basis of the outputs of the film back thermistor 18 and the heater back thermistor 19 and controls energization to the fixing heater 16 by a heater drive controller 28 which is an electric power supplying portion.

In a temperature control type of the fixing device 100, a supply electric power value to the heater is determined principally so that a detection temperature value of the film back thermistor 18 can be stably maintained at a desired temperature. As a specific method thereof, electric power is changed so that a temperature reaches a target temperature early and is stably maintained by being calculated from a target temperature, a detection temperature, a temperature change amount per unit time, a heater input electric power-values and a PI parameter of the film back thermistor 18. At that time, a direct heating source is the fixing heater 16, and therefore, in order that the temperature of the fixing film 20 is not excessively fluctuated abruptly, a detection temperature and a temperature change amount of the heater back thermistor 19 are also auxiliary subjected to PI control, so that an inner surface temperature of the fixing film 20 is stabilized early.

Further, the fixing device 100 includes a memory 29 as a second storing portion. In the memory 29, individual information on thermal responsiveness is stored. As the memory 29, in this embodiment, a nonvolatile memory such as NVRAM is employed, but a form thereof may be an IC tag such as RFID, a two-dimensional barcode, or the like. When the fixing device 100 is mounted in the image forming apparatus 200, from the memory 29, stored information thereof is read by a reading portion 31 provided in the image forming apparatus main assembly 201 of the image forming apparatus 200. Then, the memory 29 establishes mutual communication thereof with the control circuit portion 21 of the image forming apparatus 200 via the reading portion 31. In this embodiment, a control temperature (adjustment temperature) of the fixing heater 16 is determined as described later by thus reading the information stored in the memory 29 by the reading portion 31.

Figure 4:
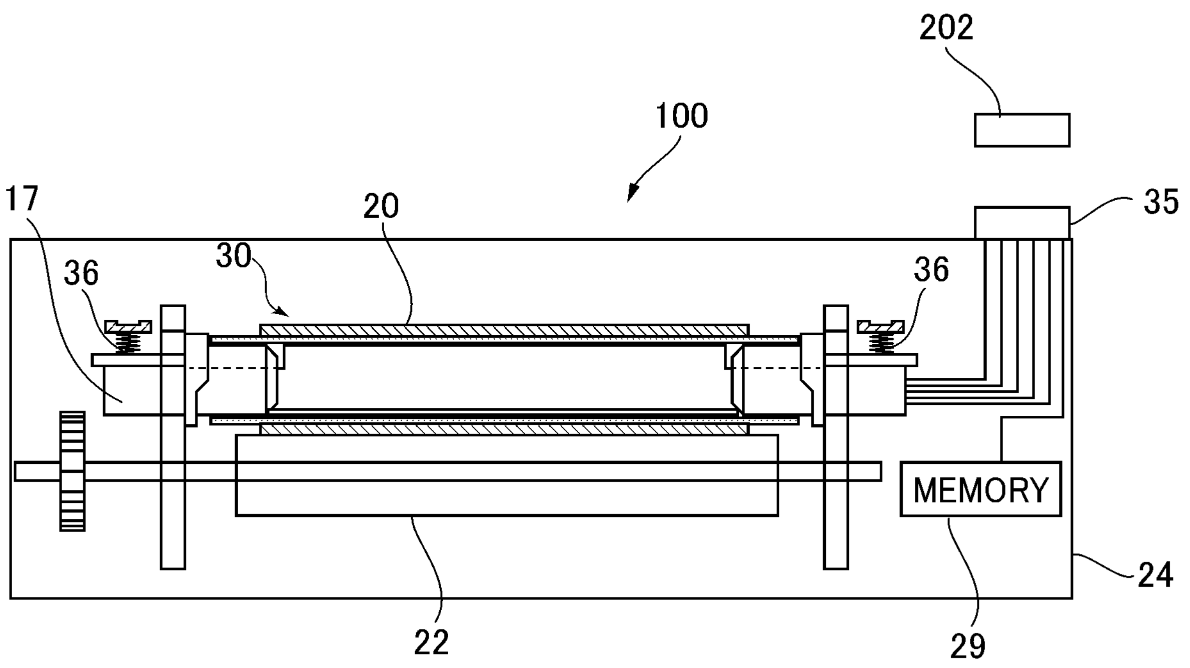
FIG. 4 is a schematic view showing a connection relationship between the fixing device and an image forming apparatus main assembly in the first embodiment.

In this embodiment, the memory 29 is provided in the fixing unit 30. The fixing unit 30 includes, as described above, the fixing film 20, the fixing heater 16, the film back thermistor 18, the heater back thermistor 19, and the like. In order to realize the supply of electric power from the image forming apparatus main assembly 201 to the fixing heater 16 and communication between each of the film back thermistor 18, the heater back thermistor 19, and the memory 29 and the control circuit portion 21 on an image forming apparatus main assembly 201 side, the fixing unit 30 includes, as shown in FIG. 4, a fixing-side drawer 35 on a fixing unit 30 side which is connectable with a main assembly-side drawer 202 on the image forming apparatus main assembly 201 side.

That is, the fixing-side drawer 35 is connected to the fixing heater 16, the film back thermistor 18, the heater back thermistor 19, and the memory 29 of the fixing unit 30 by electric wires, and is shipped integrally with the fixing unit 30. The fixing-side drawer 35 is fixed to the frame 24 of the fixing device 100 for example, when the fixing unit 30 is assembled in the fixing device 100, and is connectable with the main assembly-side drawer 202 when the fixing device 100 is assembled in the image forming apparatus main assembly 201. In this embodiment, as specifically described later, as regards the fixing device 100, the fixing unit 30 is exchangeable alone or in the form of a set thereof with the pressing roller 22.

In the fixing device 100 constituted as described above, when the image forming operation is started, the pressing roller 22 is rotationally driven at a predetermined rotational speed in an arrow direction by a motor 32 as a fixing driving portion. The motor 32 is controlled by a fixing drive controller 33 of the control circuit portion 21. The fixing film 20 in a press-contact relationship with the pressing roller 22 is rotated at the predetermined speed by rotation of the pressing roller 22. At this time, the fixing film 20 is in a state in which the outer periphery of the heater holder 17 is rotated in an arrow direction by the pressing roller 22 while the inner peripheral surface thereof is closely contacted to and solid on a sliding surface of the fixing heater 16. On the inner peripheral surface of the fixing film 20, heat-resistant grease is applied, so that a sliding property with the heater holder 17 and the fixing film 20 is ensured.

When the pressing roller 22 is rotationally driven and correspondingly therewith the cylindrical fixing film 20 is in a rotated state, energization to the fixing heater 16 is carried out. Then, when the temperature of the fixing film 20 becomes a desired temperature, the sheet P on which an unfixed toner image t is carried is guided and introduced into the fixing nip 27 along an entrance guide 23. In the fixing nip 27, the sheet P closely contacts the outer peripheral surface of the fixing film 20 on a toner image bearing surface side, so that the sheet P moves together with the fixing film 20. In a nip-feeding process of the sheet P in the fixing nip 27, heat of the fixing film 20 is imparted to the fixing film 20, so that the unfixed toner image is melt-fixed on the sheet P. The sheet P passed through the fixing nip 27 is curvature-separated and is discharged by a fixing discharge roller pair 26.

[Information Storage into Memory]

Figure 5:
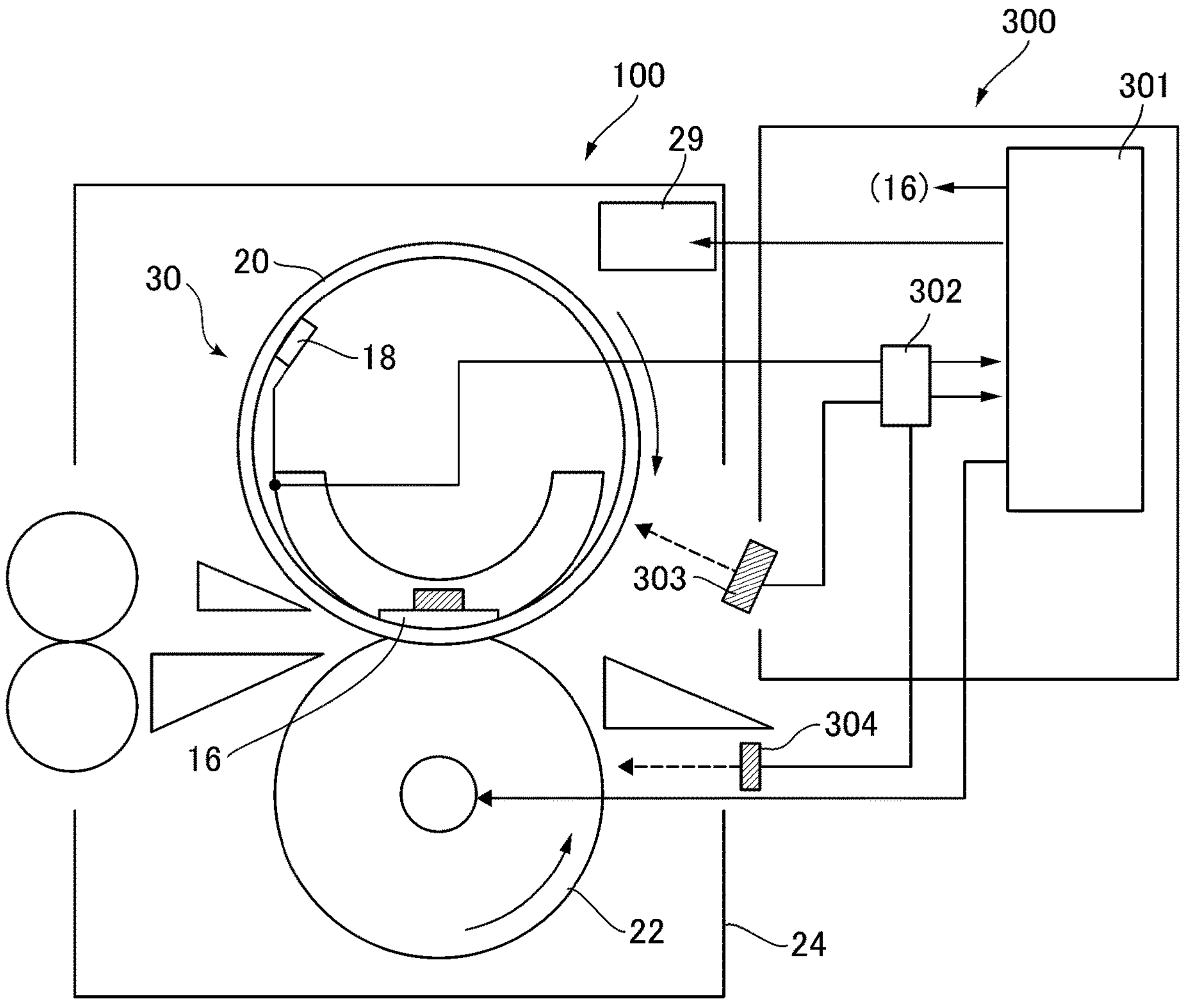
FIG. 5 is a schematic sectional view of a thermal characteristic measuring jig for the fixing device in the first embodiment.

FIG. 5 is a schematic view of a thermal characteristic measuring jig 300 for the fixing device 100 provided in a final step after completion of the fixing device 100 in a manufacturing process of the fixing device 100. The thermal characteristic measuring jig 300 measures, as a thermal conduction characteristic of the fixing device 100, surface temperatures of the fixing film 20 and the pressing roller 22, and stores the measured surface temperatures as information in the memory 29.

The thermal characteristic measuring jig 300 includes an operation (calculation) processing portion 301, an A/D converter 302, and non-contact temperature sensors 303 and 304. The non-contact temperature sensors 303 and 304 are disposed opposite to and in non-contact with the surface of the fixing film and the surface of the pressing roller 22, respectively. Such a thermal characteristic measuring jig 300 is capable of carrying out drive of the fixing device 100 in a single body state and inner surface temperature adjustment control of the fixing film 20.

That is, the film back thermistor 18 and the non-contact temperature sensors 303 and 304 are connected to the operation processing portion 301 via the A/D converter 302. This operation processing portion 301 samples outputs from the film back thermistor 18 and the non-contact temperature sensors 303 and 304 at a predetermined cyclic period and has a constitution in which the thus-acquired temperature information is reflected in the temperature adjustment control. Specifically, a detection value of the film back thermistor 18 is outputted via the A/D converter 302 inside the jig, and at the same time, by the non-contact temperature sensors 303 and 304 provided on a jig side, the surface temperature of the fixing film 20 and the surface temperature of the pressing roller 22 can be measured in a synchronization manner.

Figure 6:
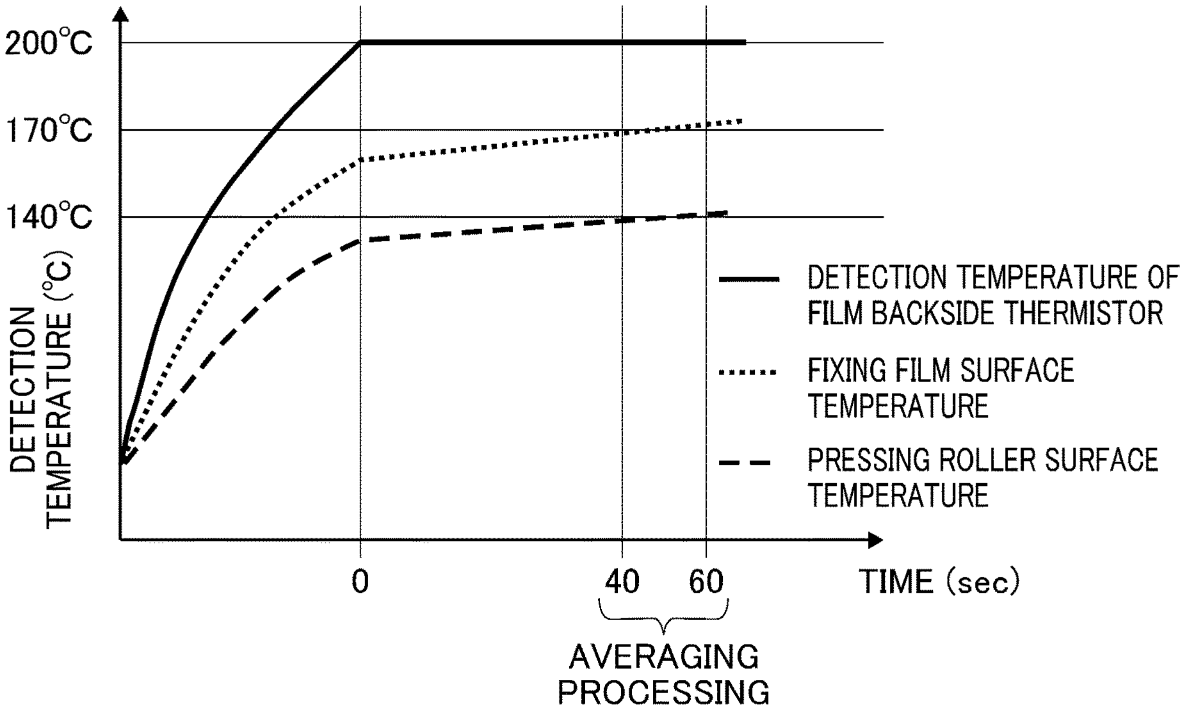
FIG. 6 is a graph showing an example of temperature progression during thermal characteristic measurement of the fixing device in the first embodiment.

In FIG. 6, temperature progressions acquired by measuring temperatures of certain (specific) fixing device 100 with the thermal characteristic measuring jig 300. A measuring condition in this embodiment was such that measurement was started from a normal temperature stable state (25±4° C.) after completion of the fixing device 100 and was made at rising electric power of 500 W±3% for the fixing heater 16 and at a control temperature of 200° C. for the film back thermistor 18, and for a measuring time of 65 sec from control temperature arrival. Further, a calculation period of the temperature written in the memory 29 was set at 20 sec from a lapse of 40 sec from the control temperature arrival to a lapse of 60 sec from the control temperature arrival. In the operation processing portion 301 inside the thermal characteristic measuring jig 300, detection temperatures of the non-contact temperature sensors 303 and 304 are stored in a sampling cyclic period of 100 ms, and are subjected to averaging process after the measurement, so that an average surface temperature Tf of the fixing film 20 and an average surface temperature Tr of the pressing roller 22 are calculated. Then, a writing operation of the calculated temperatures into the memory 29 of the fixing unit 30 is executed.

In this embodiment, after calculation, the average surface temperature Tf of the fixing film 20 is 167° C., and the average surface temperature Tr of the pressing roller 22 is 142° C., and therefore, these temperatures are made into hexadecimal digits, so that values of "A7hex" and "8Ehex" are written into the memory 29. Further, characteristic value information of (component) parts and shipping form information of the fixing device 100 are also stored in the memory 29. The characteristic value information of parts includes pieces of information on detection sensitivity of the film back thermistor 18 and the heater back thermistor 19, a contact pressure of the film back thermistor 18, an elastic layer thickness of the fixing film 20, a surface layer thickness of the fixing film 20, product hardness of the pressing roller 22, the pressing spring 36, and the like.

The shipping form information of the fixing device is information such that member to be exchanged is shipped in which form selected from the fixing device 100, the set of the fixing unit 30 and the pressing roller 22, and the fixing unit 30. That is, in this embodiment, there are three forms in which the fixing device 100 is exchanged, the fixing unit 30 and the pressing roller 22 are exchanged, and the fixing unit 30 is exchanged. Further, during shipping, information on each of the exchange forms is stored in the memory 29.

As regards the average surface temperature Tf of the fixing film 20 and the average surface temperature Tr of the pressing roller 22 in a predetermined condition, it is known that these temperatures are fluctuated principally by the following factors. The factors are detection sensitivity X1 of the film back thermistor 18, a contact pressure X2 of the arm (back-up member) 25 supporting the film back thermistor 18, an elastic layer thickness X3 and a surface layer thickness X4 of the fixing film 20, a product hardness X5 of the pressing roller X5, information X6 of the pressing spring 36 for forming the fixing nip between the fixing film 20 and the pressing roller 22 (hereinafter, this information is referred to as a pressing spring X6), and the like.

As regards the factors relating to these members, a fluctuation can be suppressed by simply increasing accuracy, but these factors lead to an increase in cost and strains mass productivity, and therefore, are not proper measured. For this reason, this embodiment aims at improving a level of mass-production quality including performances such as a fixing property, an image property, and a feeding property, of the fixing device, durability of the fixing device, a rising time and an energy-saving property of the fixing device, and the like by receiving normal variations of these members, and manufacture factors and by properly digitizing and utilizing the characteristics in the temperature adjustment control.

Specifically, in the case of the form in which the fixing device 100 is exchanged, all the above-described factors of the detection sensitivity X1, the contact pressure X2, the elastic layer thickness X3, the surface layer thickness X4, the product hardness X5, and the pressing spring X6 are stored in the memory 29 during shipping of the fixing device 100. Then, when the fixing device 100 is mounted in the image forming apparatus main assembly 201, the control circuit portion 21 on the image forming apparatus main assembly 201 side reads these factors stored in the memory 29 and then determines a target temperature in the temperature adjustment control.

Further, in the case of the form in which the fixing unit 30 and the pressing roller 22 are exchanged, of the above-described factors, the detection sensitivity X1, the contact pressure X2, the elastic layer thickness X3, the surface layer thickness X4, and the product hardness X5 are stored in the memory 29 during shipping of the fixing unit 30 and the pressing roller 22. Then, when the fixing device 100 in which the fixing unit 30 and the pressing roller 22 are exchanged is mounted in the image forming apparatus main assembly 201, the control circuit portion 21 on the image forming apparatus main assembly 201 side reads these factors stored in the memory 29. On the other hand, in the case of this embodiment, the frame 24 of the fixing device 100 is not exchanged, and the pressing spring 36 provided in the frame 24 is also not exchanged. For this reason, the pressing spring X6 stored in the main assembly memory 34 of the image forming apparatus main assembly 201 is succeeded, and then the target temperature in the temperature adjustment control is determined.

Further, in the case of the form in which the fixing unit 30 is exchanged, of the above-described factors, the detection sensitivity X1, the contact pressure X2, the elastic layer thickness X3, and the surface layer thickness X4 are stored in the memory 29 during shipping of the fixing unit 30. Then, when the fixing device 100 in which the fixing unit 30 is exchanged is mounted in the image forming apparatus main assembly 201, the control circuit portion 21 on the image forming apparatus main assembly 201 side reads these factors stored in the memory 29. On the other hand, in the case of this embodiment, the pressing roller 22, the frame 24 of the fixing device 100, and the pressing spring 36 are not exchanged. For this reason, the product hardness X5 and the pressing spring X6 which are stored in the main assembly memory 34 of the image forming apparatus main assembly 201 are succeeded, and then the target temperature in the temperature adjustment control is determined.

[Determination of Target Temperature]

Next, a method of determining the target temperature by using the above-described factors will be described. As a result of measurement for 50 mass-produced fixing devices selected randomly in conditions in this embodiment, an average of average surface temperatures Tf of fixing films 20 of the 50 fixing devices was about 160° C., and an average of average surface temperatures Tr of a pressing rollers 22 of the 50 fixing devices was about 140° C. For this reason, it can be said that the fixing devices with the measured values Tf and Tr in this embodiment are individuals with relatively high measured values. Further, variation data of the respective parts in the fixing device in this embodiment are shown in a table 1.

TABLE 1

| ITEM | ITEM | TOL*[1] | FD*[2] |
|---|---|---|---|
| TH*3 | DS*[4](X1) | ±3° C. | −1.5° C. |
| | CP*[5](X2) | ±25 gf | ±20 gf |
| FF*[6] | ET*[7](X3) | ±25 μm | 15 μm |
| | ST*[8](X4) | ±5 μm | −3 μm |
| PR*[9] | PH*[10](X5) | ±2° | −1.5° |
| FR*[11] | PS*[12](X6) | ±3 kgf | 2.5 kgf |
| | FFAST*[13](Tf) | | 167° C. |
| | PRAST*[14](Tr) | | 142° C. |

*[1]"TOL" is tolerance.
*[2]"FD" is the fixing device.
*3"TH" is the thermistor.
*[4]"DS" is the detection sensitivity.
*[5]"CP" is the contact pressure.
*[6]"FF" is the fixing film.
*[7]"ET" is the elastic layer thickness.
*[8]"ST" is the surface layer thickness.
*[9]"PR" is the pressing roller.
*[10]"PH" is the product hardness.
*[11]"FR" is the frame.
*[12]"PS" is the pressing spring.
*[13]"FFAST" is the fixing film average surface temperature.
*[14]"PRAST" is the pressing roller average surface temperature.

As a result of analysis of pieces of characteristic value information of the respective parts for the randomly selected 50 fixing devices and data measured by the thermal characteristic measuring jig 300 for the fixing devices, it was found that the average surface temperatures Tf and Tr can be expressed by the following relationship expressions (1) and (2), respectively.

$$Tf=-0.85X1-0.07X2-0.01X3-0.67X4-0.93X5+1.14X6+161 \quad (1)$$

$$Tr=-0.91X1-0.08X2+0.01X3-0.83X4-1.00X5+1.01X6+136 \quad (2)$$

The average surface temperature Tf of the fixing film 20 and the average surface temperature Tr of the pressing roller 22 which are stored in the memory 29 are utilized as correction values in the temperature adjustment control when the fixing device 100 is mounted and operated in the image forming apparatus main assembly 201. That is, by using the average surface temperatures Tf and Tr, the target temperature in the temperature adjustment control is determined. Specifically, the control circuit portion 21 determines a print control temperature (target temperature) T at which the image formation is actually carried out is determined in accordance with the following formula (3) using a target base temperature Tb, and read average surface temperatures Tf and Tr.

$$T=Tb-(0.28Tf+0.08Tr-53) \quad (3)$$

The target base temperature Tb is a control temperature as a basic recording material for carrying out temperature adjustment control of the fixing film 20 by the film back thermistor 18 on the basis of sheet information, image information, and ambient temperature information used in the image formation, and is determined from a table (internal table) in the control circuit portion 21. Further, the formula (3) is an expression acquired from a result of analysis of a relationship between characteristic values and control temperature correction of parts of the randomly selected 50 fixing devices.

Further, in the above-described thermal characteristic measuring jig 300 of the fixing device 100, the average surface temperatures Tf and Tr after the temperature of the fixing film 20 falls with a stable temperature control (adjustment) range are calculated, but a temperature difference may be calculated from an instantaneous value in a temperature rising process (for example, during passing of 190° C.). When temperature transition on or after the temperature arrives at a control temperature is not so fluctuated depending on individuals, a measuring tact time can be shortened.

Further, also, surface toner measuring points of the fixing film 20 and the pressing roller 22 are a range immediately in front of the nip with respect to a rotational direction in this embodiment, but may also be an arbitrary position with respect to a circumferential direction. Or, with respect to a longitudinal direction (rotational axis direction of the pressing roller 22) of the fixing device 100, measurement is made at a plurality of points or is continuously made in a scanning manner, and then, calculation may be made so as to extract points at which the average surface temperature Tf of the fixing film 20 and the average surface temperature Tr of the pressing roller 22 become minimum values.

[Image Forming Process]

Figure 7:
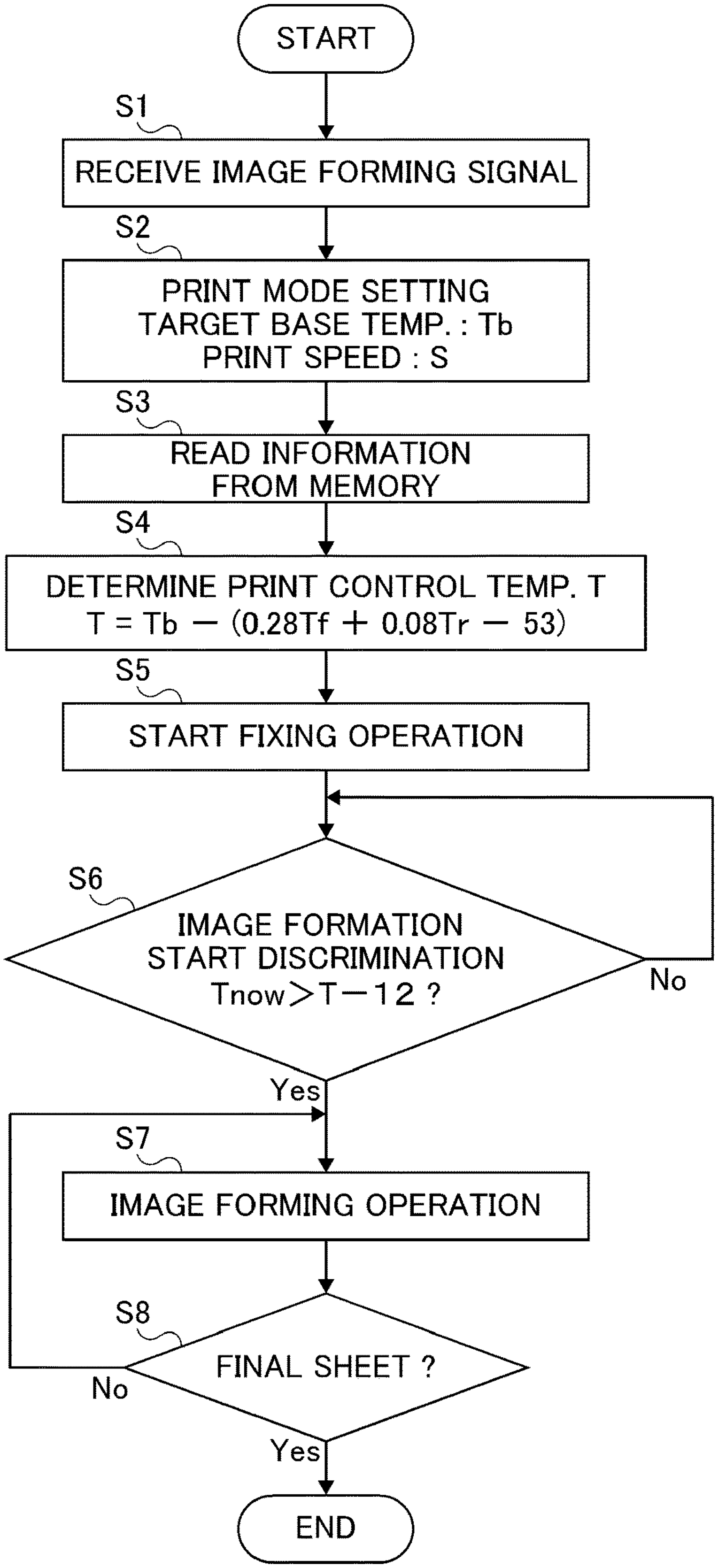
FIG. 7 is a flowchart of an image forming process in the embodiment 1.

Next, an outline of the image forming process in this embodiment including determination of the target temperature in the above-described temperature adjustment control will be described using flowchart of FIG. 7. First, when the control circuit portion 21 receives an image forming signal of an image forming job (S1), the control circuit portion 21 makes setting of an operation in a print made (image forming mode) (S2). In this embodiment, the control circuit portion 21 determines, from an internal table, a target base temperature Tb and a print speed (process speed) S which are used for subjecting the fixing film 20 to the temperature adjustment control by the film back thermistor 18 with sheet information (kind, basis weight, size), image information (monochromatic mode/color mode), and ambient (outside air) temperature information which are used in the image formation.

For example, in an example of plain paper (basis weight: 64 g/$m^2$), the color mode, and an environment of 25° C., Tb=190° C. and S=100% are determined. In general, with a larger basis weight and a lower ambient temperature, toner peeling is liable to occur, and therefore, a target temperature (control temperature) in the temperature adjustment control is set at a higher value. Very thick paper and special paper which are still severe even when a temperature is increased up to a limit are met by suppressing the print speed in some cases.

Next, the control circuit portion 21 reads, from the memory 29 of the fixing unit 30, specific thermal characteristic information, i.e., the average surface temperature Tf of the fixing film 20 and the average surface temperature Tr of the pressing roller 22 which are measured by the thermal characteristic measuring jig 300 and stored in the memory 29 during shipping (S3). In this embodiment, the above-described fixing device 100 with Tf=167° C. (A7hex) and Tr=142° C. (8Ehex) will be described as an example. From the target base temperature Tb and the read Tf and Tr, in accordance with the above-described formula (3), the control circuit portion 21 determines a print control temperature (target temperature) T at which the image formation is actually carried out (S4). In this embodiment, the control temperature T is determined as:

$$T=190-(0.28\times167+0.08\times140-53)=184.9° \text{ C.}$$

Further, the control circuit portion 21 starts drive of the pressing roller 22, and in addition, starts energization to the fixing heater 16 via the heater drive controller 28 (S5). When a detection temperature Tnow of the film back thermistor 18 satisfies a condition formula (Tnow>T−12° C.) (Yes of S6), the control circuit portion 21 permits feeding of the sheet P and sends an image forming instruction to form images on the photosensitive drums 101*y* to 101*k* (S7). That is, the image forming operation is started.

This condition formula is determined from a feeding path length of the image forming apparatus. That is, the condition formula is a condition formula set on the basis of entrance the toner-carrying sheet P into the fixing nip 27 at a timing when the temperature of the fixing film 20 just reaches the control temperature T in the case where the image forming operation is started at a timing at which the temperature is lower by 12° C. than arrival at the print control temperature T when the fixing heater 16 is raised at maximum setting electric power. In this embodiment, the condition formula is a fixed condition formula but may be a plurality of condition formulas depending on the image forming condition (sheet kind, basis weight, image information). As the image forming condition, there is a case that priority is put on a first print out speed than a fixing quality, or the like case.

Thus, the control circuit portion 21 carries out control and repeats the image forming operation while controlling the inner surface temperature of the fixing film 20 (S7), and when a final sheet of the image forming job is detected (Yes of S8), the control circuit portion 21 ends an image forming operation ending process (stop of the temperature control, lowering in high voltages, stop of the driving mechanism) and then ends a series of flows.

[Use Case]

Next, a use case in which the control in this embodiment is actually used will be described. In the following, a case that the fixing device 100 is exchanged, a case that the set of the fixing unit 30 and the pressing roller 22 is exchanged, and a case that only the fixing unit 30 is exchanged will be described.

[Use Case 1: Case of Exchange of Fixing Device]

First, the case where the fixing device 100 is exchanged at a user destination will be described. In the case where the fixing device 100 is exchanged, on the basis of shipping information (in this embodiment, information to the effect that the fixing device is exchanged) stored in the memory 29 of the fixing unit 30, whether the exchange is made in which case is discriminated by the control circuit portion 21. In the case of this case, the fixing device 100 is exchanged, and therefore, when the fixing device 100 is mounted in the image forming apparatus main assembly 201, characteristic value information of parts is stored in the main assembly memory 34 in the image forming apparatus main assembly 201.

Here, values of the characteristic value information of respective parts of the fixing device 100 before the exchange and the fixing device 100 after the exchange and data measured by the thermal characteristic measuring jig 300 of the fixing device 100 are shown in a table 2.

TABLE 2

| ITEM | ITEM | TOL*[1] | BEFORE EXCHANGE FD*[2] | AFTER EXCHANGE FD*[2] |
|---|---|---|---|---|
| TH*3 | DS*[4](X1) | ±3° C. | −1.5° C. | 1.2° C. |
| | CP*[5](X2) | ±25 gf | 20 gf | −3 gf |
| FF*[6] | ET*[7](X3) | ±25 μm | 15 μm | 5 μm |
| | ST*[8](X4) | ±5 μm | −3 μm | −1 μm |
| PR*[9] | PH*[10](X5) | ±2° | −1.5° | −0.8° C. |
| FR*[11] | PS*[12](X6) | ±3 kgf | 2.5 kgf | 1.5 kgf |
| | FFAST*[13](Tf) | | 167° C. | 162° C. |
| | PRAST*[14](Tr) | | 142° C. | 137° C. |

*[1]"TOL" is tolerance.
*[2]"FD" is the fixing device.
*3"TH" is the thermistor.
*[4]"DS" is the detection sensitivity.
*[5]"CP" is the contact pressure.
*[6]"FF" is the fixing film.
*[7]"ET" is the elastic layer thickness.
*[8]"ST" is the surface layer thickness.
*[9]"PR" is the pressing roller.
*[10]"PH" is the product hardness.
*[11]"FR" is the frame.
*[12]"PS" is the pressing spring.
*[13]"FFAST" is the fixing film average surface temperature.
*[14]"PRAST" is the pressing roller average surface temperature.

In this embodiment, by using the thermal conduction characteristic information stored in the memory 29 of the fixing unit 30 as shown in the table 2, the control circuit portion 21 is capable of setting an optimum control temperature. That is, from the table 2, it is understood that due to the characteristic values of the respective parts of the fixing device 100 after the exchange, the average surface temperature Tf of the fixing film 20 and the average surface temperature Tr of the pressing roller 22 become lower than those for the fixing device 100 before the exchange. When the print control temperature T is calculated in accordance with the above-described formula (3), the print control temperature T is:

$$T=190-(0.28\times162+0.08\times137-53=186.7°\ C.$$

By this, the control temperature of the fixing film 20 of the fixing device 100 after the exchange can be optimally controlled, so that it is possible to stabilize and improve qualities (feeding property, rising time, fixing quality, lifetime of fixing film, and the like) relating to the surface temperature of the fixing film 20.

[Use Case 2: Case of Exchange of Set of Fixing Unit and Pressing Roller]

Next, the case where the set of the fixing unit 30 and the pressing roller 22 is exchanged at a user destination will be described. In the case where the set of the fixing unit 30 and the pressing roller 22 is exchanged, on the basis of shipping information (in this embodiment, information to the effect that the set of the fixing unit and the pressing roller is exchanged) stored in the memory 29 of the fixing unit 30, whether the exchange is made in which case is discriminated by the control circuit portion 21. In the case of this case, the fixing unit 30 and the pressing roller 22 are exchanged, and therefore, when the fixing device 100 in which the fixing unit 30 and the pressing roller 22 are exchanged is mounted in the image forming apparatus main assembly 201, characteristic value information of parts is updated in a manner such that each of information stored in the main assembly memory 34 in the image forming apparatus main assembly 201 and information stored in the memory 29 of the fixing unit 30 is updated.

That is, in the main assembly memory 34, pieces of characteristic value information (detection sensitivity X1 of thermistor, contact pressure X2, elastic layer thickness X3 of fixing film, surface layer thickness X4, production hardness X5 of pressing roller) of parts relating to the fixing unit 30 and the pressing roller 22 are updated. In the memory 29 of the fixing unit 30, characteristic value information (pressing spring X6) of a part stored in the main assembly memory 34 is updated.

Here, values of the characteristic value information of respective parts of the fixing device 100 before the exchange and the fixing unit 30 and the pressing roller 22 which are to be exchanged and data measured by the thermal characteristic measuring jig 300 of the fixing device 100 are shown in a table 3.

TABLE 3

| ITEM | ITEM | TOL*[1] | FD*[2] | BEFORE EXCHANGE BC*[15] | AFTER EXCHANGE AC*[16] |
|---|---|---|---|---|---|
| TH*3 | DS*[4](X1) | ±3° C. | −1.5° C. | 1.2° C. | 1.2° C. |
| | CP*[5](X2) | ±25 gf | 20 gf | −3 gf | −3 gf |
| FF*[6] | ET*[7](X3) | ±25 μm | 15 μm | 5 μm | 5 μm |
| | ST*[8](X4) | ±5 μm | −3 μm | −1 μm | −1 μm |
| PR*[9] | PH*[10](X5) | ±2° | −1.5° | −1.5° C. | −1.5° C. |
| FR*[11] | PS*[12](X6) | ±3 kgf | 2.5 kgf | — | 2.5 kgf |
| | FFAST*[13](Tf) | | 167° C. | 162° C. | 165° C. |
| | PRAST*[14](Tr) | | 142° C. | 138° C. | 140° C. |

TABLE 3-continued

| ITEM | ITEM | TOL*1 | FD*2 | BEFORE EXCHANGE BC*15 | AFTER EXCHANGE AC*16 |
|---|---|---|---|---|---|

*1"TOL" is tolerance.
*2"FD" is the fixing device.
*3"TH" is the thermistor.
*4"DS" is the detection sensitivity.
*5"CP" is the contact pressure.
*6"FF" is the fixing film.
*7"ET" is the elastic layer thickness.
*8"ST" is the surface layer thickness.
*9"PR" is the pressing roller.
*10"PH" is the product hardness.
*11"FR" is the frame.
*12"PS" is the pressing spring.
*13"FFAST" is the fixing film average surface temperature.
*14"PRAST" is the pressing roller average surface temperature.
*15"BC" is before correction for the fixing unit and the pressing roller.
*16"AC" is after correction for the fixing unit and the pressing roller.

In this embodiment, by using the thermal conduction (characteristic) information of the memory 29 of the fixing unit 30 as shown in the table 3, the control circuit portion 21 is capable of setting an optimum control temperature. That is, in the memory 29 of the fixing unit 30 to be exchanged, the information on the pressing spring 36, i.e., the pressing spring X6 is not stored. Further, in the manufacturing step, with respect to the pressing spring with a center setting as a master setting, the average surface temperature Tf of the fixing film 20 and the average surface temperature Tr of the pressing roller 22 are stored. On the other hand, in the fixing device 100 after the exchange, the fixing unit 30 and the pressing roller 22 are exchanged, and as regards the pressing spring 36, the part before exchange is used. For that reason, by succeeding part information of the pressing spring 36, the average surface temperature Tf of the fixing film 20 and the average surface temperature Tr of the pressing roller 22 can be corrected by using the above-described formulas (1) and (2).

By this, values corrected to the average surface temperature Tf=165° C. (165.055° C.) of the fixing film 20 and the average surface temperature Tr=140° C. of the pressing roller 22 are stored in the memory 29 of the fixing unit 30. Further, from the formula (3), the print control temperature T before the correction is:

$$T=190-(0.28\times162+0.08\times138-53)=186.6^\circ \text{ C.}$$

On the other hand, the print control temperature after the correction is:

$$T=190-(0.28\times165+0.08\times140-53)=185.6^\circ \text{ C.}$$

As a result, the control temperature T after the correction can be lowered by 1.0° C. compared with the control temperature T before the correction. That is, in this embodiment, in the case where the fixing unit 30 and the pressing roller 22 are exchanged, the control circuit portion 21 calculates a correction value (0.28Tf+0.08Tr−53) for the target base temperature Tb in the temperature adjustment control by using information (X6 in this embodiment) other than the information on the fixing unit 30 and the pressing roller 22 stored in the main assembly memory 34 and the information (X1 to X5 in this embodiment) on the fixing unit 30 and the pressing roller 22 stored in the memory 29. Then, on the basis of a calculated correction value, by using the above-described formula (3), the target base temperature Tb is corrected, so that the target temperature T is determined.

Thus, in this embodiment, even when the fixing unit 30 and the pressing roller 22 are exchanged and the pressing spring 36 is not exchanged, by succeeding the information on the pressing spring 36, the influence on the performance of the fixing device 100 can be suppressed.

That is, the control temperature of the fixing film 20 can be optimally controlled, so that it is possible to stabilize and improve qualities (feeding property, rising time, fixing quality, lifetime of fixing film, and the like) relating to the surface temperature of the fixing film 20.

[Use Case 3: Case of Exchange of Fixing Unit]

Next, the case where the fixing unit 30 is exchanged at a user destination will be described. In the case where the fixing unit 30 is exchanged, on the basis of shipping information (in this embodiment, information to the effect that the fixing unit is exchanged) stored in the memory 29 of the fixing unit 30, whether the exchange is made in which case is discriminated. In the case of this case, the fixing unit 30 is exchanged, and therefore, when the fixing device 100 in which the fixing unit 30 is exchanged is mounted in the image forming apparatus main assembly 201, characteristic value information of parts is updated in a manner such that each of information stored in the main assembly memory 34 in the image forming apparatus main assembly 201 and information stored in the memory 29 of the fixing unit 30 is updated.

That is, in the main assembly memory 34, pieces of characteristic value information (detection sensitivity X1 of thermistor, contact pressure X2, elastic layer thickness X3 of fixing film, surface layer thickness X4) of parts relating to the fixing unit 30 are updated. In the memory 29 of the fixing unit 30, characteristic value information (production hardness X5 of pressing roller, pressing spring X6) of a part stored in the main assembly memory 34 is updated.

Here, values of the characteristic value information of respective parts of the fixing device 100 before the exchange and the fixing unit 30 to be exchanged and data measured by the thermal characteristic measuring jig 300 of the fixing device 100 are shown in a table 4.

TABLE 4

| ITEM | ITEM | TOL*[1] | FD*[2] | BEFORE EXCHANGE BC*[15] | AFTER EXCHANGE AC*[16] |
|---|---|---|---|---|---|
| TH*3 | DS*[4](X1) | ±3° C. | −1.5° C. | 1.2° C. | 1.2° C. |
| | CP*[5](X2) | ±25 gf | 20 gf | −3 gf | −3 gf |
| FF*[6] | ET*[7](X3) | ±25 μm | 15 μm | 5 μm | 5 μm |
| | ST*[8](X4) | ±5 μm | −3 μm | −1 μm | −1 μm |
| PR*[9] | PH*[10](X5) | ±2° | −1.5° | — | −1.5° C. |
| FR*[11] | PS*[12](X6) | ±3 kgf | 2.5 kgf | — | 2.5 kgf |
| | FFAST*[13](Tf) | | 167° C. | 161° C. | 165° C. |
| | PRAST*[14](Tr) | | 142° C. | 136° C. | 140° C. |

*[1]"TOL" is tolerance.
*[2]"FD" is the fixing device.
*3"TH" is the thermistor.
*[4]"DS" is the detection sensitivity.
*[5]"CP" is the contact pressure.
*[6]"FF" is the fixing film.
*[7]"ET" is the elastic layer thickness.
*[8]"ST" is the surface layer thickness.
*[9]"PR" is the pressing roller.
*[10]"PH" is the product hardness.
*[11]"FR" is the frame.
*[12]"PS" is the pressing spring.
*[13]"FFAST" is the fixing film average surface temperature.
*[14]"PRAST" is the pressing roller average surface temperature.
*[15]"BC" is before correction for the fixing
*[16]"AC" is after correction for the fixing device.

In this embodiment, by using the thermal conduction (characteristic) information of the memory 29 of the fixing unit 30 as shown in the table 4, the control circuit portion 21 is capable of setting an optimum control temperature. That is, in the memory 29 of the fixing unit 30 to be exchanged, the pieces of information on the product hardness of the pressing roller 22 and the pressing spring 36 is not stored. Further, in the manufacturing step, with respect to the pressing roller 22 and the pressing spring 36 with center settings as master settings, the average surface temperature Tf of the fixing film 20 and the average surface temperature Tr of the pressing roller 22 are stored. On the other hand, in the fixing device 100 after the exchange, only the fixing unit 30 is exchanged, and as regards the pressing roller 22 and the pressing spring 36, the parts before exchange are used. For that reason, by succeeding pieces of part information of the pressing roller 22 and the pressing spring 36, the average surface temperature Tf of the fixing film 20 and the average surface temperature Tr of the pressing roller 22 can be corrected by using the above-described formulas (1) and (2).

By this, values corrected to the average surface temperature Tf=165° C. of the fixing film 20 and the average surface temperature Tr=140° C. of the pressing roller 22 are stored in the memory 29 of the fixing unit 30. Further, from the formula (3), the print control temperature T before the correction is:

$$T=190-(0.28\times 161+0.08\times 136-53)=186.7° \text{ C.}$$

On the other hand, the print control temperature after the correction is:

$$T=190-(0.28\times 165+0.08\times 140-53)=185.6° \text{ C.}$$

As a result, the control temperature T after the correction can be lowered by 1.1° C. compared with the control temperature T before the correction.

That is, in this embodiment, in the case where the fixing unit 30 is exchanged, the control circuit portion 21 calculates a correction value (0.28Tf+0.08Tr−53) for the target base temperature Tb in the temperature adjustment control by using information (X5 and X6 in this embodiment) other than the information on the fixing unit 30 stored in the main assembly memory 34 and the information ((X1 to X5 in this embodiment) on the fixing unit 30 stored in the memory 29. Then, on the basis of a calculated correction value, by using the above-described formula (3), the target base temperature Tb is corrected, so that the target temperature T is determined.

Thus, in this embodiment, even when the fixing unit 30 is exchanged and the pressing roller 22 and the pressing spring 36 are not exchanged, by succeeding the information on the pressing spring 36, the influence on the performance of the fixing device 100 can be suppressed.

That is, the control temperature of the fixing film 20 can be optimally controlled, so that it is possible to stabilize and improve qualities (feeding property, rising time, fixing quality, lifetime of fixing film, and the like) relating to the surface temperature of the fixing film 20.

As described above, depending on an exchange unit of the parts in the fixing device 100, the characteristic value information on the part(s) before the exchange is succeeded to the characteristic value information on the part(s) after the exchange and is stored in the memory 29, and then, the average surface temperature Tf of the fixing film 20 and the average surface temperature Tr of the pressing roller 22 are corrected, so that the control temperature is capable of being controlled with high accuracy.

Second Embodiment

A second embodiment will be described while making reference to the above-described drawings. This embodiment is different from the first embodiment in target temperature determining method in temperature adjustment control. A constitution of a fixing device 100 is the same as the constitution of the fixing device 100 in the first embodiment, and therefore, description overlapping with the description of the first embodiment is omitted, and a difference from the first embodiment will be principally described.

[Determination of Target Temperature]

The target temperature determining method in this embodiment will be described using the factors, described in the first embodiment, including the detection sensitivity X1 of the film back thermistor 18, the contact pressure X2, the elastic layer thickness of the fixing film 20, the surface layer thickness X4, the product hardness X5 of the pressing roller 22, and the pressing spring X6 (information on the pressing spring 36). By this condition, as a result of analysis of an optimum control temperature correction value and the characteristic value information on the parts for each of 20 fixing devices which are randomly selected mass-produced articles, it was found that the target base temperature Tb can be represented by the following formula (4).

$$Tc=-0.030X1-0.002X2+0.003X3-0.115X4-0.562X5+0.624X6+3.37 \quad (4)$$

The correction value Tc calculated by this calculation formula is stored in the memory 29 of the fixing unit 30 and is utilized as a correction value for the temperature adjustment control when the fixing device 100 is mounted and operated in the image forming apparatus main assembly 201. In other words, in the main assembly memory 34 of the image forming apparatus main assembly 201, the target base temperature Tb in the temperature adjustment control and the correction value Tc with which the target base temperature Tb is corrected to the target temperature T in the temperature adjustment control are stored.

Here, a correcting method will be described using, as an example, a fixing device 100 shown in a table 5.

TABLE 5

| ITEM | ITEM | TOL*1 | FD*2 |
|---|---|---|---|
| TH*3 | DS*4(X1) | ±3° C. | −2° C. |
| | CP*5(X2) | ±25 gf | 25 gf |
| FF*6 | ET*7(X3) | ±25 μm | −22 μm |
| | ST*8(X4) | ±5 μm | −4.6 μm |
| PR*9 | PH*10(X5) | ±2° | −2° |
| FR*11 | PS*12(X6) | ±3 kgf | 3.0 kgf |
| | CTCV*13(Tc) | | 6.8° C. |

*1"TOL" is tolerance.
*2"FD" is the fixing device.
*3"TH" is the thermistor.
*4"DS" is the detection sensitivity.
*5"CP" is the contact pressure.
*6"FF" is the fixing film.
*7"ET" is the elastic layer thickness.
*8"ST" is the surface layer thickness.
*9"PR" is the pressing roller.
*10"PH" is the product hardness.
*11"FR" is the frame.
*12"PS" is the pressing spring.
*13"CTCV" is the control temperature correction value.

From the target base temperature Tb and the read correction value Tc, the print control temperature T at which the image is actually formed is determined in accordance with the following formula (5).

$$T=Tb-Tc \quad (5)$$

In this embodiment, the control temperature T is determined as follows.

$$T=190-6.8=183.2° \text{ C.}$$

[Use Case]

Next, a use case in which the control in this embodiment is actually used will be described. In the following, a case that the fixing device 100 is exchanged, a case that the set of the fixing unit 30 and the pressing roller 22 is exchanged, and a case that only the fixing unit 30 is exchanged will be described.

[Use Case 4: Case of Exchange of Fixing Device]

First, the case where the fixing device 100 is exchanged at a user destination will be described. In the case where the fixing device 100 is exchanged, on the basis of shipping information (in this embodiment, information to the effect that the fixing device is exchanged) stored in the memory 29 of the fixing unit 30, whether the exchange is made in which case is discriminated by the control circuit portion 21. In the case of this case, the fixing device 100 is exchanged, and therefore, when the fixing device 100 is mounted in the image forming apparatus main assembly 201, characteristic value information of parts is stored in the main assembly memory 34 in the image forming apparatus main assembly 201.

Here, values of the characteristic value information of respective parts of the fixing device 100 before the exchange and the fixing device 100 after the exchange and the control temperature correction value Tc are shown in a table 6.

TABLE 6

| ITEM | ITEM | TOL*1 | BEFORE EXCHANGE FD*2 | AFTER EXCHANGE FD*2 |
|---|---|---|---|---|
| TH*3 | DS*4(X1) | ±3° C. | −2° C. | −1° C. |
| | CP*5(X2) | ±25 gf | 25 gf | 2 gf |
| FF*6 | ET*7(X3) | ±25 μm | −22 μm | 20 μm |
| | ST*8(X4) | ±5 μm | −4.6 μm | −1.6 μm |
| PR*9 | PH*10(x5) | ±2° | −2° | −1° C. |
| FR*11 | PS*12(X6) | ±3 kgf | 3.0 kgf | 1.0 kgf |
| | FFAST*13(Tf) | | 6.8° C. | 4.8° C. |

*1"TOL" is tolerance.
*2"FD" is the fixing device.
*3"TH" is the thermistor.
*4"DS" is the detection sensitivity.
*5"CP" is the contact pressure.
*6"FF" is the fixing film.
*7"ET" is the elastic layer thickness.
*8"ST" is the surface layer thickness.
*9"PR" is the pressing roller.
*10"PH" is the product hardness.
*11"FR" is the frame.
*12"PS" is the pressing spring.
*13"CTCV" is the control temperature correction value.

In this embodiment, by using the control thermistor correction value Tc stored in the memory 29 of the fixing unit 30 as shown in the table 6, the control circuit portion 21 is capable of setting an optimum control temperature. That is, from the table 6, due to the characteristic values of the respective parts of the fixing device 100 after the exchange, the control temperature correction value Tc becomes lower than that for the fixing device 100 before the exchange. When the print control temperature T is calculated in accordance with the above-described formula (3), the print control temperature T is:

$$T=190-4.8=185.2° \text{ C.}$$

By this, the control temperature of the fixing film 20 of the fixing device 100 after the exchange can be optimally controlled, so that it is possible to stabilize and improve qualities (feeding property, rising time, fixing quality, lifetime of fixing film, and the like) relating to the surface temperature of the fixing film 20.

[Use Case 5: Case of Exchange of Set of Fixing Unit and Pressing Roller]

Next, the case where the set of the fixing unit 30 and the pressing roller 22 is exchanged at a user destination will be described. In the case where the set of the fixing unit 30 and the pressing roller 22 is exchanged, on the basis of shipping information (in this embodiment, information to the effect that the set of the fixing unit and the pressing roller is exchanged) stored in the memory 29 of the fixing unit 30, whether the exchange is made in which case is discriminated by the control circuit portion 21. In the case of this case, the fixing unit 30 and the pressing roller 22 are exchanged, and therefore, when the fixing device 100 in which the fixing unit 30 and the pressing roller 22 are exchanged is mounted in the image forming apparatus main assembly 201, characteristic value information of parts is updated in a manner such that each of information stored in the main assembly memory 34 in the image forming apparatus main assembly 201 and information stored in the memory 29 of the fixing unit 30 is updated.

That is, in the main assembly memory 34, pieces of characteristic value information (detection sensitivity X1 of thermistor, contact pressure X2, elastic layer thickness X3 of fixing film, surface layer thickness X4, production hardness X5 of pressing roller) of parts relating to the fixing unit 30 and the pressing roller 22 are updated. In the memory 29 of the fixing unit 30, characteristic value information (pressing spring X6) of a part stored in the main assembly memory 34 is updated.

Here, values of the characteristic value information of respective parts of the fixing device 100 before the exchange and the fixing unit 30 and the pressing roller 22 which are to be exchanged and the control temperature correction value Tc are shown in a table 7.

TABLE 7

| ITEM | ITEM | TOL*[1] | FD*[2] | BEFORE EXCHANGE BC*[14] | AFTER EXCHANGE AC*[15] |
|---|---|---|---|---|---|
| TH *3 | DS*[4](X1) | ±3° C. | −2° C. | −1° C. | −1° C. |
| | CP*[5](X2) | ±25 gf | 25 gf | 2 gf | 2 gf |
| FF*[6] | ET*[7](X3) | ±25 μm | −22 μm | 20 μm | 20 μm |
| | ST*[8](X4) | ±5 μm | −4.6 μm | −1.6 μm | −1.6 μm |
| PR*[9] | PH*[10](X5) | ±2° | −2° | −2° C. | −2° C. |
| FR*[11] | PS*[12](X6) | ±3 kgf | 3.0 kgf | — | 3.0 kgf |
| | CTCV*[13](Tc) | | 6.8° C. | 4.8° C. | 6.6° C. |

*[1]"TOL" is tolerance.
*[2]"FD" is the fixing device.
*3: "TH" is the thermistor.
*[4]"DS" is the detection sensitivity.
*[5]"CP" is the contact pressure.
*[6]"FF" is the fixing film.
*[7]"ET" is the elastic layer thickness.
*[8]"ST" is the surface layer thickness.
*[9]"PR" is the pressing roller.
*[10]"PH" is the product hardness.
*[11]"FR" is the frame.
*[12]"PS" is the pressing spring.
*[13]"CTCV" is the control temperature correction value.
*[14]"BC" is before correction for the fixing unit and the pressing roller.
*[15]"AC" is after correction for the fixing unit and the pressing roller.

control temperature correction value Tc can be corrected by using the above-described formula (4).

By this, the control temperature correction value Tc=6.6° C. is stored in the memory 29 of the fixing unit 30. Further, from the formula (5), the print control temperature T before the correction is:

$$T=190-4.8=185.2° \text{ C.}$$

On the other hand, the print control temperature after the correction is:

$$T=190-6.6=183.4° \text{ C.}$$

As a result, the control temperature T after the correction can be lowered by 1.8° C. compared with the control temperature T before the correction.

That is, in this embodiment, in the case where the fixing unit 30 and the pressing roller 22 are exchanged, the control circuit portion 21 updates the correction value Tc by using information (X6 in this embodiment) other than the information on the fixing unit 30 and the pressing roller 22 stored in the main assembly memory 34 and the information (X1 to X5 in this embodiment) on the fixing unit 30 and the pressing roller 22 stored in the memory 29. Then, on the basis of the updated correction value Tc, the target base temperature Tb is corrected, so that the target temperature T in the temperature adjustment control is determined.

Thus, in this embodiment, even when the fixing unit 30 and the pressing roller 22 are exchanged and the pressing spring 36 is not exchanged, by succeeding the information In this embodiment, by using the control temperature correction value Tc of the memory 29 of the fixing unit 30 as shown in the table 7, the control circuit portion 21 is capable of setting an optimum control temperature. That is, in the memory 29 of the fixing unit 30 to be exchanged, the information on the pressing spring 36, i.e., the pressing spring X6 is not stored. On the other hand, in the fixing device 100 after the exchange, the fixing unit 30 and the pressing roller 22 are exchanged, and as regards the pressing spring 36, the part before exchange is used. For that reason, by succeeding part information of the pressing spring 36, the on the pressing spring 36, the influence on the performance of the fixing device 100 can be suppressed.

That is, the control temperature of the fixing film 20 can be optimally controlled, so that it is possible to stabilize and improve qualities (feeding property, rising time, fixing quality, lifetime of fixing film, and the like) relating to the surface temperature of the fixing film 20.

[Use Case 6: Case of Exchange of Fixing Unit]

Next, the case where the fixing unit 30 is exchanged at a user destination will be described. In the case where the fixing unit 30 is exchanged, on the basis of shipping information (in this embodiment, information to the effect that the fixing unit is exchanged) stored in the memory 29 of the fixing unit 30, whether the exchange is made in which case is discriminated. In the case of this case, the fixing unit 30 is exchanged, and therefore, when the fixing device 100 in which the fixing unit 30 is exchanged is mounted in the image forming apparatus main assembly 201, characteristic value information of parts is updated in a manner such that each of information stored in the main assembly memory 34 in the image forming apparatus main assembly 201 and information stored in the memory 29 of the fixing unit 30 is updated.

That is, in the main assembly memory 34, pieces of characteristic value information (detection sensitivity X1 of thermistor, contact pressure X2, elastic layer thickness X3 of fixing film, surface layer thickness X4) of parts relating to the fixing unit 30 are updated. In the memory 29 of the fixing unit 30, characteristic value information (production hardness X5 of pressing roller, pressing spring X6) of a part stored in the main assembly memory 34 is updated.

Here, values of the characteristic value information of respective parts of the fixing device 100 before the exchange and the fixing unit 30 to be exchanged and the control temperature correction value Tc are shown in a table 8.

By this, a control temperature correction value Tc=6.6° C. is stored in the memory 29 of the fixing unit 30. Further, from the formula (5), the print control temperature T before the correction is:

$$T=190-3.6=186.4° \text{ C.}$$

On the other hand, the print control temperature after the correction is:

$$T=190-6.6=183.4° \text{ C.}$$

As a result, the control temperature T after the correction can be lowered by 3.0° C. compared with the control temperature T before the correction.

That is, in this embodiment, in the case where the fixing unit 30 is exchanged, the control circuit portion 21 updates the correction value Tc by using information (X5 and X6 in this embodiment) other than the information on the fixing unit 30 stored in the main assembly memory 34 and the information ((X1 to X5 in this embodiment) on the fixing unit 30 stored in the memory 29. Then, on the basis of the updated correction value Tc, the target base temperature Tb is corrected, so that the target temperature T in the temperature adjustment control is determined.

TABLE 8

| ITEM | ITEM | TOL*1 | FD*2 | BEFORE EXCHANGE BC*14 | AFTER EXCHANGE AC*15 |
|---|---|---|---|---|---|
| TH*3 | DS*4(X1) | ±3° C. | −2° C. | −1° C. | −1° C. |
| | CP*5(X2) | ±25 gf | 25 gf | 2 gf | 2 gf |
| FF*6 | ET*7(X3) | ±25 μm | −22 μm | 20 μm | 20 μm |
| | ST*8(X4) | ±5 μm | −4.6 μm | −1.6 μm | −1.6 μm |
| PR*9 | PH*10(X5) | ±2° | −2° | — | −2° C. |
| FR*11 | PS*12(X6) | ±3 kgf | 3.0 kgf | — | 3.0 kgf |
| | CTCV*13(Tc) | | 6.8° C. | 3.6° C. | 6.6° C. |

*1"TOL" is tolerance.
*2"FD" is the fixing device.
*3"TH" is the thermistor.
*4"DS" is the detection sensitivity.
*5"CP" is the contact pressure.
*6"FF" is the fixing film.
*7"ET" is the elastic layer thickness.
*8"ST" is the surface layer thickness.
*9"PR" is the pressing roller.
*10"PH" is the product hardness.
*11"FR" is the frame.
*12"PS" is the pressing spring.
*13"CTCV" is the control temperature correction value.
*14"BC" is before correction for the fixing
*15"AC" is after correction for the fixing device.

In this embodiment, by using the control temperature correction value Tc of the memory 29 of the fixing unit 30 as shown in the table 8, the control circuit portion 21 is capable of setting an optimum control temperature. That is, in the memory 29 of the fixing unit 30 to be exchanged, the pieces of information on the product hardness of the pressing roller 22 and the pressing spring 36 is not stored. On the other hand, in the fixing device 100 after the exchange, only the fixing unit 30 is exchanged, and as regards the pressing roller 22 and the pressing spring 36, the parts before exchange are used. For that reason, by succeeding pieces of part information of the pressing roller 22 and the pressing spring 36, the control temperature correction value Tc can be corrected by using the above-described formula (4).

Thus, in this embodiment, even when the fixing unit 30 is exchanged and the pressing roller 22 and the pressing spring 36 are not exchanged, by succeeding the information on the pressing spring 36, the influence on the performance of the fixing device 100 can be suppressed.

That is, the control temperature of the fixing film 20 can be optimally controlled, so that it is possible to stabilize and improve qualities (feeding property, rising time, fixing quality, lifetime of fixing film, and the like) relating to the surface temperature of the fixing film 20.

As described above, depending on an exchange unit of the parts in the fixing device 100, the information on the part(s) before the exchange is succeeded to the information on the part(s) after the exchange and is stored in the memory 29, and then, the control temperature correction value Tc is corrected, so that the control temperature is capable of being controlled with high accuracy.

In the above-described embodiments, a constitution as the fixing belt, the fixing film which is a film-like member was used was described, but for example, the fixing belt may be a belt prepared by providing an elastic layer and a surface layer on a base layer made of a resin material. Further, the fixing unit may have a constitution in which the fixing belt is stretched by a plurality of stretching members. Further, the nip forming member may be a belt other than the roller and may preferably be a rotatable member.

According to this embodiment, even in the case where the fixing unit is exchanged alone or in the case where the set of the fixing unit and the nip forming member is exchanged, the influence on a performance of the fixing device can be suppressed. Further, information on parts which are not exchanged can be succeeded.

Third Embodiment

In this embodiment, in the case where the fixing device is exchanged, materials of parts constituting the fixing device are changed before and after the exchange in some instances. For example, in the case where the material of the fixing belt is changed, a thermal conduction characteristic of the fixing belt is changed in some instances. In such a case, in the fixing device after the exchange, when the heater is subjected to the temperature adjustment control, there is a liability that the surface temperature of the fixing belt cannot be controlled to a desired temperature and thus an image quality of a product lowers. A third embodiment aims at providing a constitution in which a lowering in image quality after the exchange of the fixing device can be suppressed.

Comparison Example

Figure 8:
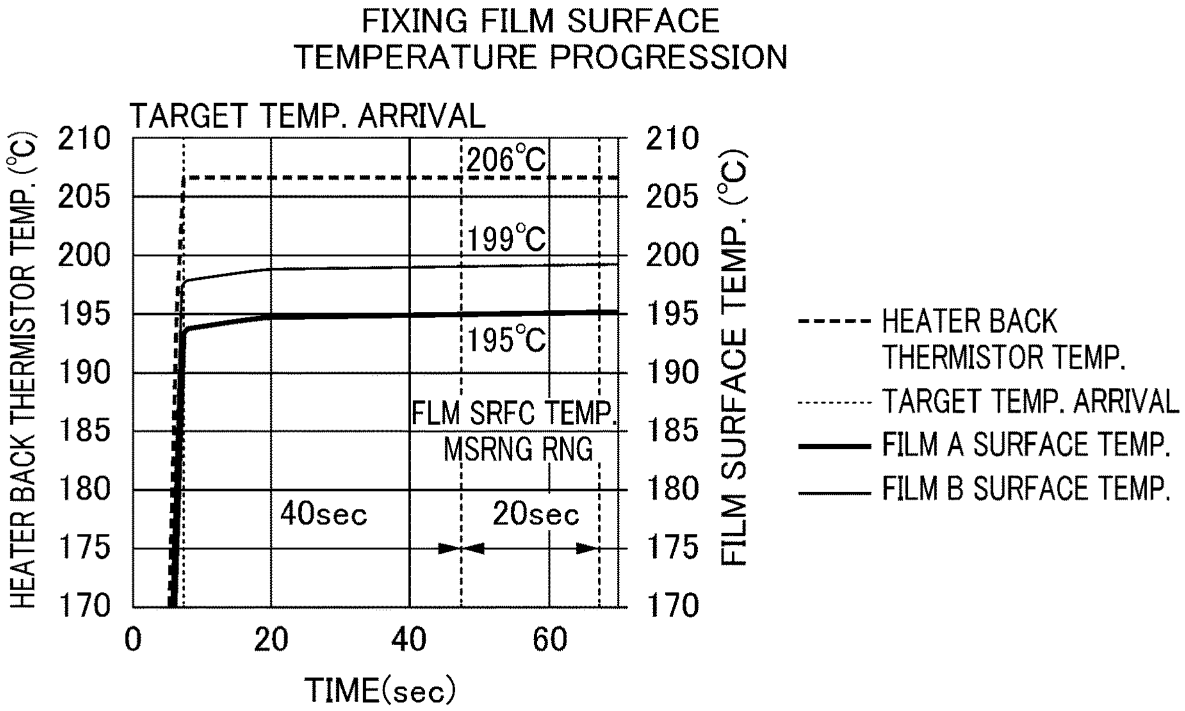
FIG. 8 is a graph showing a temperature progression of a thermistor and a fixing film in temperature adjustment control in a comparison example.

In FIG. 8, as a comparison example, a progression when the surface temperature of the fixing film 20 is measured using the fixing device 100, of the image forming apparatus 200, in which an arbitrary fixing film 20 is incorporated. As a measuring condition, measurement is started from a normal temperature stable state (21° C. or more and 29° C. or less), specifically from 23° C., and is made at raising electric power of 500 W±3%, for the fixing heater 16, and at a control temperature of 206° C. for the heater back thermistor 19, and an average value of the surface temperature for 20 sec from after 40 sec from control temperature arrival to after 60 sec from the control temperature arrival was calculated. First, an average surface temperature (hereinafter, referred to as a surface temperature) of a fixing film 20*a* (film A) in the case of the fixing device 100 in which the fixing film 20*a* using a present material (hereinafter, referred to as a present fixing film) was 195° C. Then, a surface temperature of a fixing film 20*b* (film B) using a material changed (hereinafter, referred to as a changed fixing film, film B) was 199° C. This means that in the case where the present fixing film 20*a* and the changed fixing film 20*b* are used in a co-present state in present control, the fixing device is used in an excessive temperature condition when the changed fixing film 20*b* is used. As a result, such a case is accompanied with a risk of image defect, improper feeding (conveyance), or lowering in lifetime of an associated member.

[Identification Information]

Therefore, in this embodiment, in order to reduce such a risk, information which is referred to an identification information 01 indicating that the fixing film is the fixing film 20*b* is written in the memory 29 during shipping. Then, the fixing device 100 is exchanged and when the fixing device 100 including the fixing film 20*b* is mounted in the image forming apparatus 200, on the basis of the identification information 01 read by the reading portion 31, a control temperature controlled by the control circuit portion 21 is determined. That is, in the embodiment, when the fixing device 100 is exchanged, the control circuit portion 21 causes the reading portion 31 to read the identification information stored in the memory 29 included in the fixing device 100 after the exchange, and then determines temperature adjustment control depending on the fixing device 100 after the exchange. In this embodiment, the surface temperature of the present fixing film 20*a* is controlled by the control temperature capable of being reproduced by the changed fixing film 20*b*. FIG. 9 is a summary of a result under a condition shown in FIG. 8.

In this embodiment, in the case where the fixing device 100 in which the changed fixing film 20*b* is incorporated is used in the normal temperature stable state (21° C. or more and 29° C. or less), the control temperature is controlled in a manner such that a present temperature is multiplied by 0.990 which is control temperature control information $\alpha b$ stored in the memory 29. That is, the control temperature control information $\alpha$ is a correction coefficient depending on the fixing device 100. In this embodiment, this control temperature control information $\alpha$ is stored in the memory 29, and the control circuit portion 21 uses, as a target temperature in the temperature adjustment control, a temperature obtained by multiplying a target base temperature in the temperature adjustment control by the correction coefficient depending on the fixing device 100 after the exchange.

In FIGS. 8 and 9, the control temperature control information $\alpha$ in the normal temperature stable state is stored, but as shown in FIG. 10, control temperature control information $\alpha$ in a high-temperature environment (30° C. or more) or a low-temperature environment (20° C. or less) is changed and then may be separately stored. Further, the control temperature control information $\alpha$ reflects a confirmation result when specifications of the changed fixing film 20*b* are determined. Incidentally, the following parameters are inputted to a temperature control table during marketing of the image forming apparatus so that even after the marketing, the present invention is applicable without making software change of the image forming apparatus.

Here, the control temperature is a target temperature with respect to a detection temperature of the heater back thermistor 19, and in the case where this control temperature is a "target temperature (control temperature) T", a control temperature as a reference temperature is a "basic control temperature Tx", and identification information stored in a memory 29 of a certain fixing device 100 is "control temperature control information $\alpha x$", the control temperature T is represented by a formula shown below. Incidentally, the "basic control temperature Tx" is a control temperature as a reference temperature in the temperature adjustment control set in advance depending on the operation in the image forming mode, and is stored during the shipping of the image forming apparatus 200.

$$[\text{Control temperature } T]=[\text{Basic control temperature } Tx]\times[\text{Control temperature control information } \alpha x]$$

It is known that a temperature difference between the inner peripheral surface and the outer peripheral surface of the fixing film 20 under a predetermined condition is principally influenced by the following factors. The factors include an elastic layer thickness and a surface layer thickness of the fixing film 20, detection sensitivity of the film back thermistor 18, a shape and a contact pressure of the arm (back-up member) 25, a heat-resistant grease characteristic of grease applied to the inner peripheral surface of the fixing film 20 in an initial stage, and the like factor. The control temperature control information αx is a correction coefficient in consideration of these factors, and includes information on the thermal conduction characteristic of the fixing film 20. The identification information is not limited to the correction coefficient such as the control temperature control information αx, but may also be a plurality of pieces of information. Further, in advance, as the information on the thermal conduction characteristic of the fixing film 20, for example, thermal conductivity of the fixing film 20 may be included in the identification information.

Here, in the case where materials of members such as the fixing film of the fixing device for the exchange are changed, although the factors relating to these members may be made equivalent to those for the fixing device (present article) which is used presently, for that purpose, new material development is needed, and thus leads to an increase in cost. In order to reduce the cost, general-purpose materials are diverted in many instances, with the result that options for material selection become narrow, so that characteristic values of the above-described factors could not be adapted to the present article in some cases. In this embodiment, a difference in characteristic value between the member of which material is changed and the member as the present article is accepted, and then a difference between a control temperature which is a control factor appearing due to the difference in characteristic value and the surface temperature of the fixing film 20 which is a control characteristic value is converted into numerical values and is utilized in the temperature adjustment control, so that levels of basic fixing functions (image quality, feeding (conveyance) property), durability, and the like are improved.

The control temperature which is the target temperature in the temperature adjustment control is determined in the following manner, for example. That is, on the basis of the information on the thermal conduction characteristic included in the identification information read by the reading portion 31, in the case where the thermal conductivity of the fixing film 20 included in the fixing device 100 after the exchange is a first value, the control circuit portion 21 determines the target temperature (control temperature) in the temperature adjustment control, as a first temperature. On the other hand, in the case where the thermal conductivity of the fixing film 20 included in the fixing device 100 after the exchange is a second value larger than the first value, the control circuit portion 21 determines the control temperature, as a second temperature lower than the first temperature.

[Image Forming Process]

Next, an outline of a flow of the image forming process in this embodiment including determination of the control temperature as described above will be described using FIG. 11. First, when the control circuit portion 21 receives an image forming signal of an image forming job (S1), the control circuit portion 21 makes setting of an operation in a print made (image forming mode) (S2). In this embodiment, the control circuit portion 21 determines, from an internal table, the basic control temperature Tx for subjecting the fixing film 20 to the temperature adjustment control by the film back thermistor 18 with sheet information (kind, basis weight, size), image information (monochromatic mode/color mode), and ambient (outside air) temperature information which are used in the image formation.

For example, in the case of plain paper (basis weight: 64 $g/m^2$), the color mode, and an environment of 23° C., Tx=206° C. is determined. With a larger basis weight and a lower ambient temperature, toner peeling is liable to occur, and therefore, a target control temperature is set at a higher value. For this reason, the value of Tx is set in general depending on each of the sheet information (kind, basis weight, size), the image information (monochromatic mode/color mode), and the ambient temperature information which are described above.

Next, the control circuit portion 21 reads specific control temperature control information αx from the memory 29 of the fixing device 100 (S3). In this embodiment, the fixing device 100 in which the fixing film 20*b* (film B) after the change in material as described above is incorporated and which has αx=0.990 in the normal temperature stable state will be described as an example. In accordance with a formula below based on the basic control temperature Tx and the read αx value, print control temperature T at which printing is actually carried out is determined (S4).

$$T=Tx\times\alpha x=206°\text{ C.}\times0.990=204°\text{ C.}$$

Tx=206° C.: basic target control temperature in this condition

αx=0.990: control temperature control information associated with fixing film 20*b*

Thus, in this embodiment, as the control temperature during the printing, 204° C. is determined. Further, the control circuit portion 21 starts drive of the pressing roller 22, and in addition, starts energization to the fixing heater 16 via the heater drive controller 28 (S5).

When a detection temperature Tnow of the film back thermistor 18 satisfies a condition formula (Tnow>T−12° C.) (Yes of S6), the control circuit portion 21 permits feeding of the sheet P and sends an image forming instruction to form images on the photosensitive drums 101*y* to 101*k* (S7). That is, the image forming operation is started.

This condition formula is determined from a feeding path length of the image forming apparatus, and the condition formula is a condition formula set on the basis of entrance the toner-carrying sheet P into the fixing nip 27 at a timing when the temperature of the fixing film 20 just reaches the temperature T in the case where the image forming operation is started at a timing at which the temperature is lower by 12° C. than arrival at the print control temperature T when the fixing heater 16 is raised at maximum setting electric power. In this embodiment, the condition formula is a fixed condition formula but may be a plurality of condition formulas depending on the print condition (sheet kind, basis weight, image information).

Thus, the control circuit portion 21 carries out control and repeats the image forming operation while controlling the inner surface temperature of the fixing film 20 (S7), and when a final sheet of the image forming job is detected (Yes of S8), the control circuit portion 21 ends an image forming operation ending process (stop of the temperature control, lowering in high voltages, stop of the driving mechanism) and then ends a series of flows.

As described above, by optimally controlling the film control temperature during the printing, it is possible to stabilize and improve image quality (feeding property, fixing image quality, fixing member lifetime, and the like) relating to the surface temperature of the fixing member. Particularly, in the case where the fixing device 100 is exchanged with the fixing device 100 different in material of at least a part from the fixing device 100 before the exchange, it is possible to suppress a lowering in image quality after the exchange of the fixing device 100.

Specific Comparison Examples

Next, in order to described the above-described effect, specific comparison examples and specific embodiments will be described. First, the specific comparison examples will be described. Here, as regards the above-described fixing device 100, in the case of the plain paper (basis weight: 64 $g/m^2$), the operation in the color mode, and the 23° C. environment, it has turned out that the following problem occurs, by previous study.

That is, when the image forming operation is performed at a surface temperature of 199° C. or more for the fixing film 20, a high-temperature-side image quality lowering (hot offset, gloss lowering) occurs. Further, when the image forming operation is performed at 206° C. or more at which the surface temperature of the fixing film 20 becomes high, improper feeding of the sheet (jam due to curling of the sheet, fold of a leading end of the sheet) occurs. On the other hand, when the image forming operation is performed at a surface temperature of 189° C. or less for the fixing film 20, a low-temperature-side image quality lowering (improper fixing) occurs. Accordingly, a temperature (high-temperature-side image quality allowable temperature) at which the high-temperature-side image quality lowering does not occur is set at 198° C., a temperature (improper feeding allowable temperature) at which the improper feeding does not occur is set at 205° C., and a temperature (low-temperature-side image quality allowable temperature) at which the low-temperature-side image quality lowering does not occur is set at 190° C.

Figure 11:
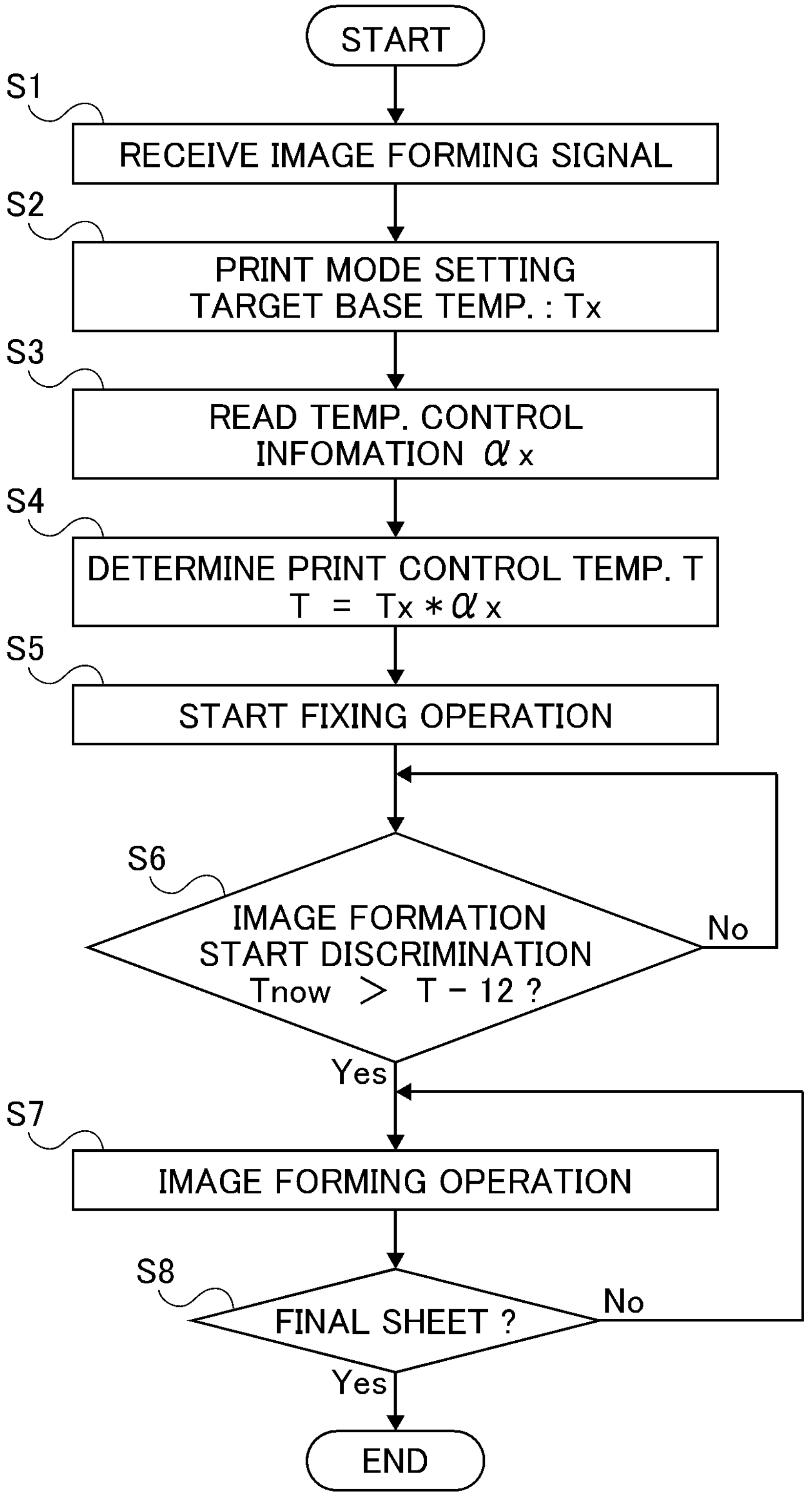
FIG. 11 is a flowchart of an image forming process in the second embodiment.
Figure 12:
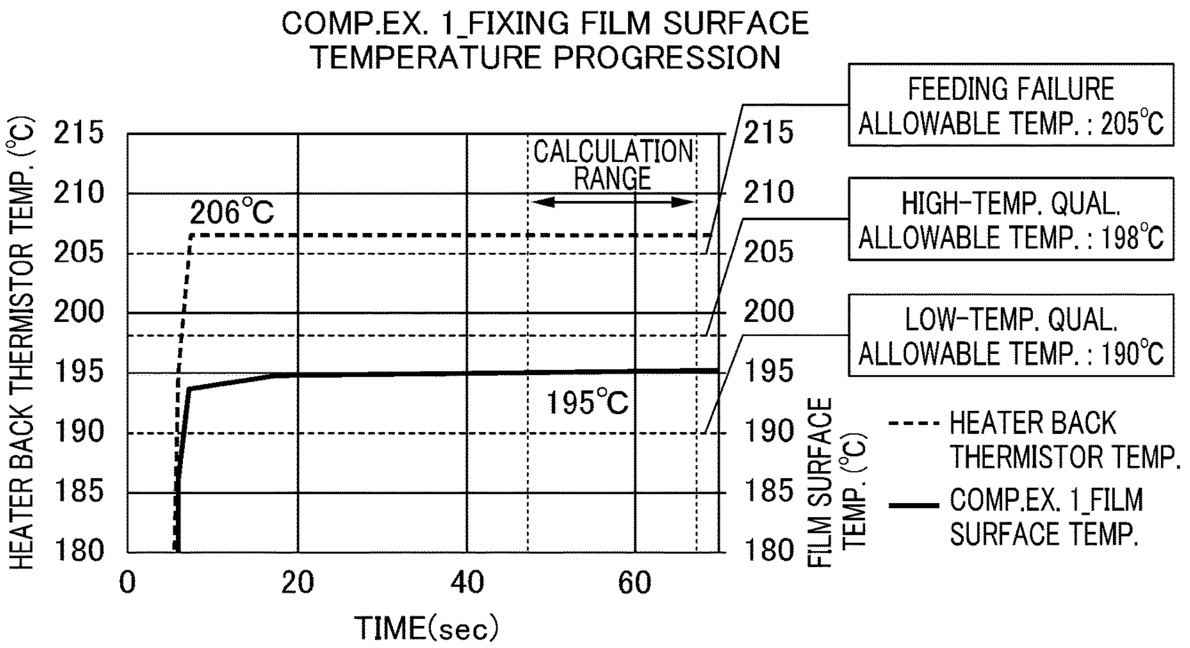
FIG. 12 is a graph showing temperature progressions of a thermistor and a fixing film in the case where the fixing film which is a present article is subjected to temperature adjustment control of a comparison example (specific comparison example 1).
Figure 13:
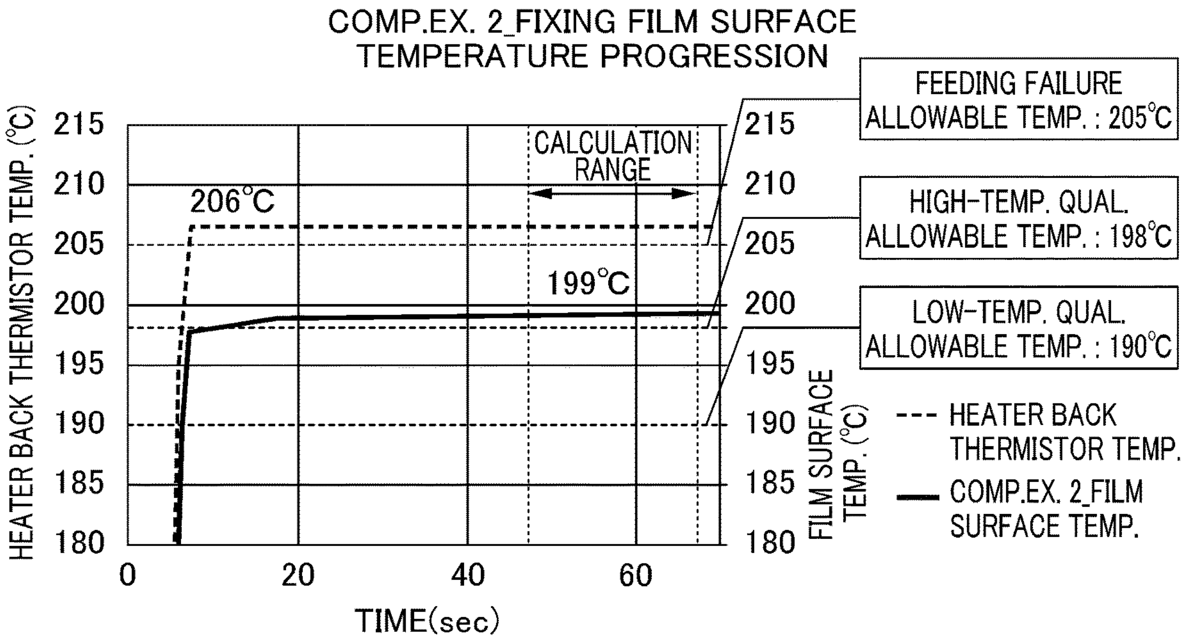
FIG. 13 is a graph showing temperature progressions of a thermistor and a fixing film in the case where the fixing film higher in thermal conductivity than the present article is subjected to temperature adjustment control of a comparison example (specific comparison example 2).
Figure 14:
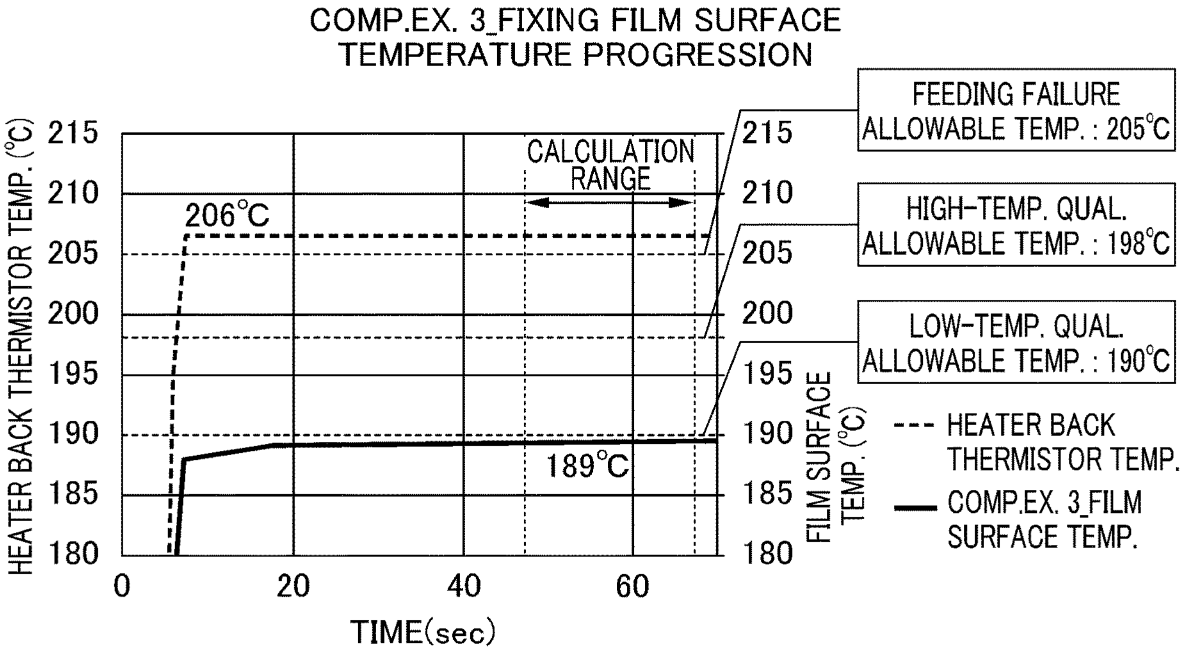
FIG. 14 is a graph showing temperature progressions of a thermistor and a fixing film in the case where the fixing film lower in thermal conductivity than the present article is subjected to temperature adjustment control of a comparison example (specific comparison example 3).

Temperature progressions in the case of control of the specific comparison examples in which the above-described control in this embodiment is not applied are shown in FIGS. 12, 13, and 14. In the specific comparison examples, a step 3 (reading of the control temperature control information αx) of a control flow of FIG. 11 and a step 4 (setting process of the print control temperature T) of the control flow of FIG. 11 do not exist. For this reason, the print control temperature T by the film back thermistor 18 is 206° C. uniformly even when the kind of the fixing film 20 in the fixing device is different.

Specific Comparison Example 1

FIG. 12 is a time change progression of a surface temperature of the fixing film 20*a* in the fixing device 100 in which the fixing film 20*a* using a present article material is incorporated. The surface temperature was an average of surface temperature values from after 40 sec to after 60 sec, from after control temperature arrival. The surface temperature was 195° C., and even in a section of after 60 sec from after target control temperature arrival, the surface temperature was capable of being maintained between 190° C. to 198° C. which are film surface temperatures at which an abnormal phenomenon does not occur.

Specific Comparison Example 2

FIG. 13 is a time change progression of a surface temperature of the fixing film 20*b* in the fixing device 100 in which the fixing film 20*b* constituted by a film material higher in thermal conductivity than the present article material is incorporated. The surface temperature was an average of surface temperature values from after 40 sec to after 60 sec, from after control temperature arrival. The surface temperature was 199° C., and even in a section of after 60 sec from after target control temperature arrival, the surface temperature was not capable of being maintained between 190° C. to 198° C. which are film surface temperatures at which an abnormal phenomenon does not occur.

Specific Comparison Example 3

FIG. 14 is a time change progression of a surface temperature of the fixing film 20*c* in the fixing device 100 in which the fixing film 20*c* constituted by a film material lower in thermal conductivity than the present article material is incorporated. The surface temperature was an average of surface temperature values from after 40 sec to after 60 sec, from after control temperature arrival. The surface temperature was 189° C., and even in a section of after 60 sec from after target control temperature arrival, the surface temperature was not capable of being maintained between 190° C. to 198° C. which are film surface temperatures at which an abnormal phenomenon does not occur.

SPECIFIC EMBODIMENTS

Figure 15:
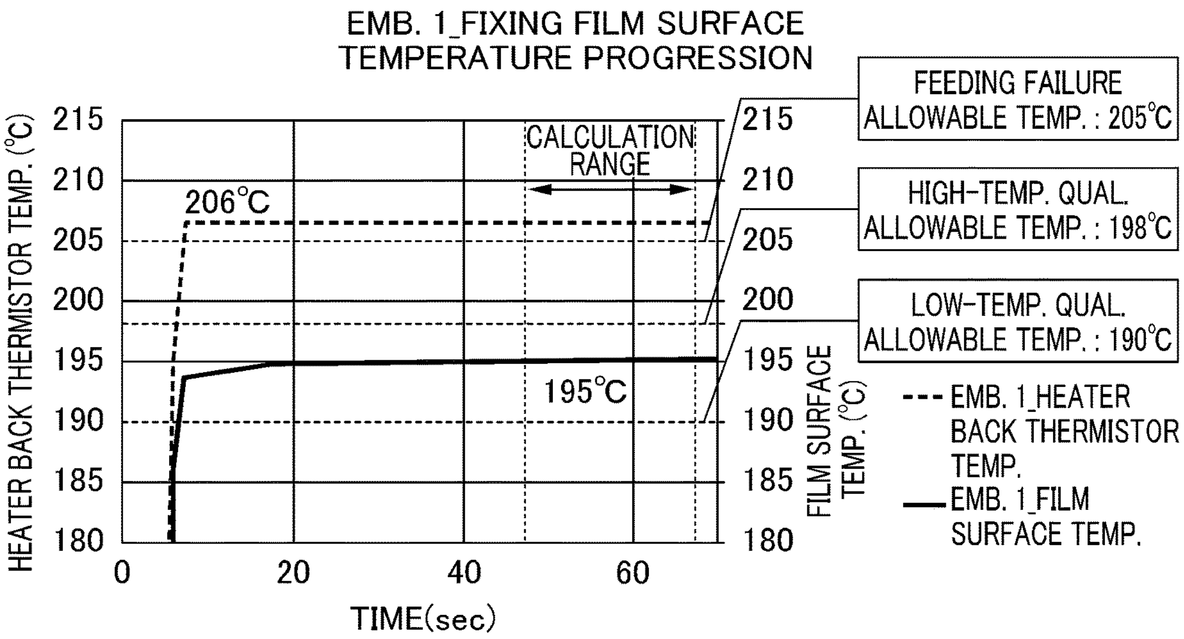
FIG. 15 is a graph showing temperature progressions of a thermistor and a fixing film in the case where the fixing film which is the present article is subjected to temperature adjustment control of the second embodiment (specific embodiment 1).
Figure 16:
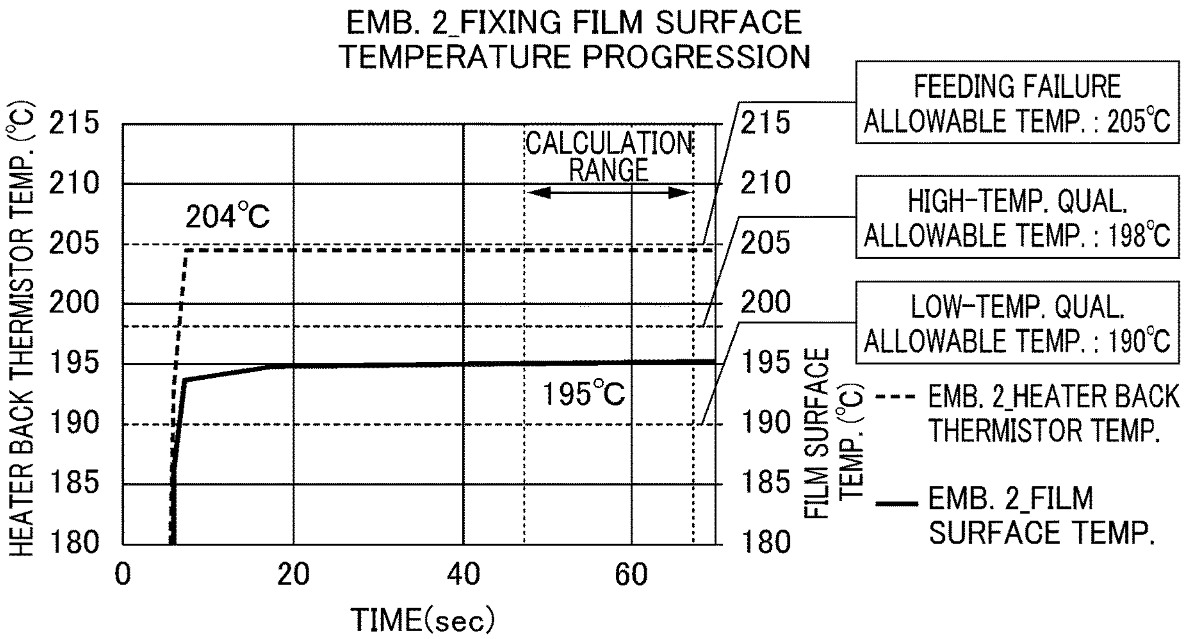
FIG. 16 is a graph showing temperature progressions of a thermistor and a fixing film in the case where the fixing film higher in thermal conductivity than the present article is subjected to temperature adjustment control of the second embodiment (specific embodiment 2).
Figure 17:
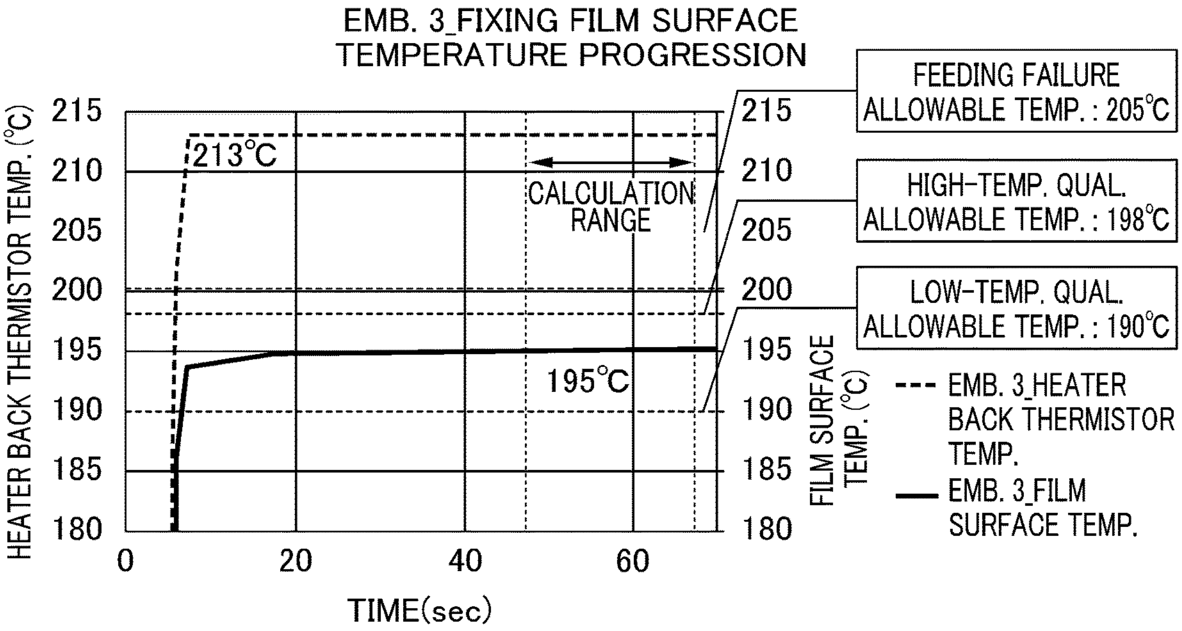
FIG. 17 is a graph showing temperature progressions of a thermistor and a fixing film in the case where the fixing film lower in thermal conductivity than the present article is subjected to temperature adjustment control of the second embodiment (specific embodiment 3).

Temperature progressions in the case of control of specific embodiments in which the control in this embodiment is applied are shown in FIGS. 15, 16, and 17. In the specific embodiments, different from the specific comparison examples, the step 3 (reading of the control temperature control information αx) and the step 4 (setting process of the print control temperature T) of the control flow of FIG. 11 are performed. For this reason, the print control temperature T by the film back thermistor 18 is changed depending on the kind of the fixing film 20 in the fixing device.

Specific Embodiment 1

FIG. 15 is a time change progression of a surface temperature of a fixing film 20*a* in the case of the fixing device 100 in which the fixing film 20*a* using a present article material is incorporated. Results of the reading of the control temperature control information αx in the step 3 and the target control temperature calculation in the step 4 of the control flow of FIG. 11 were as follows.

$$T=Tx\times\alpha x=206°\text{ C.}\times1.000=206°\text{ C.}$$

Tx=206° C.: Basic target control temperature in this condition

αx=1.000: Control temperature control information associated with fixing film 20*a*

Thus, in this specific embodiment, as the control temperature during the printing, 206° C. is determined. The surface temperature was an average of surface temperature values from after 40 sec to after 60 sec, from after control temperature arrival. The surface temperature was 195° C., and even in a section of after 60 sec from after control temperature arrival, the surface temperature was capable of being maintained between 190° C. to 198° C. which are film surface temperatures at which the abnormal phenomenon does not occur.

Specific Embodiment 2

FIG. 16 is a time change progression of a surface temperature of a fixing film 20*b* in the case of the fixing device

100 in which the fixing film 20*b* constituted by a film material higher in thermal conductivity than the present article material is incorporated. Results of the reading of the control temperature control information αx in the step 3 and the target control temperature calculation in the step 4 of the control flow of FIG. 11 were as follows.

$$T=Tx\times\alpha x=206^\circ \text{ C.}\times 0.990=204^\circ \text{ C.}$$

Tx=206° C.: Basic target control temperature in this condition

αx=0.990: Control temperature control information associated with fixing film 20*b*

Thus, in this specific embodiment, as the control temperature during the printing, 204° C. is determined. The surface temperature was an average of surface temperature values from after 40 sec to after 60 sec, from after control temperature arrival. The surface temperature was 195° C., and even in a section of after 60 sec from after control temperature arrival, the surface temperature was capable of being maintained between 190° C. to 198° C. which are film surface temperatures at which the abnormal phenomenon does not occur.

Specific Embodiment 3

FIG. 17 is a time change progression of a surface temperature of a fixing film 20*c* in the case of the fixing device 100 in which the fixing film 20*c* constituted by a film material lower in thermal conductivity than the present article material is incorporated. Results of the reading of the control temperature control information αx in the step 3 and the target control temperature calculation in the step 4 of the control flow of FIG. 11 were as follows.

$$T=Tx\times\alpha x=206^\circ \text{ C.}\times 1.034=213^\circ \text{ C.}$$

Tx=206° C.: Basic target control temperature in this condition

αx=1.034: Control temperature control information associated with fixing film 20*c*

Thus, in this specific embodiment, as the control temperature during the printing, 213° C. is determined. The surface temperature was an average of surface temperature values from after 40 sec to after 60 sec, from after control temperature arrival. The surface temperature was 195° C., and even in a section of after 60 sec from after control temperature arrival, the surface temperature was capable of being maintained between 190° C. to 198° C. which are film surface temperatures at which the abnormal phenomenon does not occur.

FIG. 18 is a list in which results the specific comparison examples 1 to 3 and the specific embodiments 1 to 3 are summarized. In the specific comparison example 2, hot offset in which the high-temperature-side image quality was lowered occurred, and in the specific comparison example 3, improper fixing in which the low-temperature-side quality was lowered occurred. On the other hand, in the specific embodiments 1 to 3 using the control of this embodiment, in all the conditions, the abnormal phenomenon and the improper feeding which lower the high-temperature-side image quality and the low-temperature side image quality did not occur.

From the above-described results, according to this embodiment, it turned out that even in the case where it was difficult to completely adapt factors to physical characteristic values such as conventional dimensions and the thermal characteristics when materials and steps of respective parts constituting the fixing device are changed due to various reasons, the image forming apparatus recognizes the kind of the fixing unit in the fixing device and information associated with the kind and thus carried out optimum fixing temperature control and is capable of suppressing occurrences of improper sheet feeding and image defects.

Incidentally, in the above description, description was made in the change in only the fixing film, but as shown in FIG. 19, it is also possible that optimum control temperature control information αx stored in the memory 29 for each of combinations of kinds of the fixing unit and then is utilized. That is, identification information stored in the memory of the fixing device is not limited to only the fixing film information, but may also include information on another member such as the pressing roller.

For example, it is assumed that a present article "A" and a member "B" different in material from the present article "A" are used as the fixing member such as the fixing film and that a present article "A" and a member "B" different in material from the present article "A" are used as the pressing member such as the pressing roller. In this instance, the control temperature control information αx is changed in each of the case where both the fixing member and the pressing member are "A", the case where one of the fixing member and the pressing member is "A" and the other member is "B", and the case where both the fixing member and the pressing member are "B", so that it becomes possible to carry out proper temperature control depending on the associated case.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-133399 filed on Aug. 24, 2022, and 2022-133400 filed on Aug. 24, 2022, which are hereby incorporated by reference herein in their entirety.

What is claimed is:

1. An image forming apparatus comprising:

a fixing device configured to fix a toner image on a recording material, wherein the fixing device includes a fixing unit including an endless fixing belt, a heating portion for heating the fixing belt, and a temperature detecting portion for detecting a temperature of the fixing belt and includes a nip forming member for forming a nip in which a recording material carrying thereon a toner image is nipped and fed between itself and the fixing belt and in which the toner image is fixed on the recording material, and wherein each of a plurality of parts including the fixing unit and the nip forming member and used in the fixing device is capable of being exchanged;

a first storing portion configured to store information on the fixing device; and a controller configured to carry out temperature adjustment control of the heating portion on the basis of the temperature detected by the detecting portion, wherein in a case that a predetermined part of the plurality of parts is exchanged, the controller succeeds information other than information on the predetermined part of the information on the fixing device stored in the first storing portion, and determines a target temperature in the temperature adjustment control by using the succeeded information and information on the predetermined part used after being exchanged.

2. An image forming apparatus according to claim 1, wherein said fixing unit includes:

a second storing portion before the predetermined part is exchanged and in which information on the predetermined part used before exchange, and a third storing portion after the predetermined part is exchanged and in which information on the predetermined part used after the exchange.

3. An image forming apparatus according to claim 2, wherein in the third storing portion, information on a part, of the plurality of parts, other than the predetermined part is not stored.

4. An image forming apparatus according to claim 2, wherein in a case that the predetermined part is exchanged, the controller calculates a correction value for a target base temperature in the temperature adjustment control by using information other than the information on the predetermined part stored in the first storing portion and the information on the predetermined part stored in the third storing portion, and then determines the target temperature by correcting the target base temperature with the calculated correction value.

5. An image forming apparatus according to claim 2, wherein in the first storing portion, a target base temperature in the temperature adjustment control and a correction value for determining the target temperature by correcting the target base temperature are stored, and wherein in a case that the predetermined part is exchanged, the controller updates the correction value by using information other than the information on the predetermined part stored in the first storing portion and the information on the predetermined part stored in the third storing portion.

6. An image forming apparatus according to claim 1, wherein the information on the fixing device includes information on the fixing belt and information on the temperature detecting portion.

7. An image forming apparatus according to claim 1, wherein the fixing device further includes a pressing portion for pressing the fixing belt toward the nip forming member, and wherein the information on the fixing device includes information on the pressing portion.

* * * * *